(12) United States Patent
Miyamoto

(10) Patent No.: US 8,171,264 B2
(45) Date of Patent: May 1, 2012

(54) CONTROL SUB-UNIT AND CONTROL MAIN UNIT

(75) Inventor: Noboru Miyamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 654 days.

(21) Appl. No.: 11/843,295

(22) Filed: Aug. 22, 2007

(65) Prior Publication Data

US 2008/0229082 A1 Sep. 18, 2008

(30) Foreign Application Priority Data

Mar. 12, 2007 (JP) .................. 2007-062226

(51) Int. Cl.
*G06F 9/40* (2006.01)
(52) U.S. Cl. ...................... 712/216; 712/217
(58) Field of Classification Search .................. 712/216, 712/217
See application file for complete search history.

(56) References Cited

U.S. PATENT DOCUMENTS

| | | | | |
|---|---|---|---|---|
| 5,430,851 A * | 7/1995 | Hirata et al. | ................... | 712/212 |
| 5,511,172 A * | 4/1996 | Kimura et al. | ................ | 712/235 |
| 5,627,982 A * | 5/1997 | Hirata et al. | ................... | 712/206 |
| 6,978,460 B2 * | 12/2005 | Arakawa | ....................... | 718/103 |
| 7,330,983 B2 * | 2/2008 | Chaparro et al. | ............. | 713/300 |
| 7,386,414 B2 * | 6/2008 | Aguilar et al. | ................ | 702/130 |
| 2002/0129227 A1 * | 9/2002 | Arakawa | ....................... | 712/228 |
| 2004/0128663 A1 * | 7/2004 | Rotem | ......................... | 717/161 |
| 2004/0243379 A1 * | 12/2004 | Paulraj | ........................... | 703/22 |
| 2005/0216775 A1 * | 9/2005 | Inoue | ............................ | 713/300 |
| 2008/0040089 A1 * | 2/2008 | Beyene et al. | .................. | 703/14 |

FOREIGN PATENT DOCUMENTS

| | | |
|---|---|---|
| JP | 4-131561 | 5/1992 |
| JP | 4-238745 | 8/1992 |
| JP | 06028182 A * | 2/1994 |
| JP | 2002-67833 | 3/2002 |
| JP | 2002-347479 | 12/2002 |
| JP | 2003-191774 | 7/2003 |
| JP | 2004-136816 | 5/2004 |
| JP | 2004-249980 | 9/2004 |
| JP | 2005-199951 | 7/2005 |

OTHER PUBLICATIONS

Office Action issued Dec. 20, 2011, in Japanese Patent Application No. 2007-062226 (with English-language translation).

* cited by examiner

*Primary Examiner* — Aimee Li

(74) *Attorney, Agent, or Firm* — Oblon, Spivak, McClelland, Maier & Neustadt, L.L.P.

(57) ABSTRACT

A sub-unit judges whether an instruction received from an external unit is executable. If the instruction is judged to be executable, the sub-unit executes it. If, on the other hand, the instruction is judged to be unexecutable, the sub-unit notifies the external unit of an executable plan.

7 Claims, 20 Drawing Sheets

CONTROL SUB-UNIT AND CONTROL MAIN UNIT

BACKGROUND OF THE INVENTION

1. Field of the Invention

The present invention relates to a semiconductor device, and more particularly to a control sub-unit and control main unit that are suitable for constructing an integrated system for a vehicle.

2. Background Art

A known vehicle control system disclosed by JP-A-2004-136816 includes a main unit and a plurality of sub-units that are subordinate to the main unit. When this system configuration is employed, the main unit can use the sub-units to efficiently detect abnormalities. This system configuration also makes it possible to reduce the amount of communication data. The above-mentioned vehicle control system achieves the purpose of the main unit by allowing the plurality of sub-units to execute instructions from the main unit. To achieve the purpose of the main unit, the main unit determines instructions that are to be issued to the sub-units. In this instance, the instructions issued by the main unit could be unpredictable by the sub-units. Other prior art includes JP-A-2004-249980, JP-A-2002-67833, JP-A-2003-191774, JP-A-2005-199951, JP-A-1992-238745, and JP-A-1992-131561.

In the conventional vehicle control system described above, the main unit recognizes an abnormality deviating from an ideal state after it occurs in a sub-unit. In other words, the system including the main unit and sub-units is not capable of inhibiting the sub-units from becoming abnormal. The above abnormality may occur when, for instance, a sub-unit executes an instruction issued by the main unit in the above-mentioned ideal state without considering whether the instruction is executable. When all instructions issued by the main unit are indiscriminatingly executed in the above-mentioned conventional system, an abnormality occurs, causing the sub-units to deviate from their ideal state.

When an abnormality in a sub-unit is recognized, a vehicle control system having a main unit and sub-units generally shuts off the power supply to the sub-unit. Shutting off the power supply achieves a vehicle control purpose of bringing a vehicle to a safe stop. However, no output is generated from the sub-unit that is turned off. Eventually, the system cannot produce a desired output.

SUMMARY OF THE INVENTION

The present invention has been made to solve the above problem. An object of the present invention is to provide a control sub-unit and control main unit that protect the sub-unit by avoiding the execution of an instruction that is not expected by the sub-unit, and generate an output desired by the main unit or an output close to the desired one by allowing the sub-unit to continue operating within its permissible range.

According to one aspect of the present invention, a control sub-unit includes instruction reception means for receiving an instruction from an external unit, executability judgment means for judging whether an instruction received by the instruction reception means is executable, instruction execution means for executing an instruction that is judged by the executability judgment means to be executable, and executable plan transmission means for transmitting an executable plan to the external unit when the received instruction is judged by the executability judgment means to be unexecutable.

According to another aspect of the present invention, a control main unit includes instruction means for issuing instructions to a plurality of sub-units, executable plan recognition means for recognizing whether the executable plan is returned from the plurality of sub-units, and instruction change means, which, when an executable plan is recognized by the executable plan recognition means, changes the instructions for the plurality of sub-units in accordance with the executable plan.

According to another aspect of the present invention a control sub-unit includes multiple instruction reception means for receiving a plurality of instructions from an external unit, multiple instruction executability judgment means for judging whether each of the plurality of instructions received by the multiple instruction reception means is executable, and execution means for executing an instruction that is judged by the multiple instruction executability judgment means to be executable.

According to another aspect of the present invention a control sub-unit includes instruction reception means for receiving an instruction from an external unit, executability judgment means for judging whether an instruction received by the instruction reception means is executable, instruction change means, which, when the instruction received by the instruction reception means is judged by the executability judgment means to be unexecutable, switches from the instruction received by the instruction reception means to an executable instruction, and means for executing the executable instruction or an instruction that is judged by the executability judgment means to be executable.

According to another aspect of the present invention a control sub-unit comprising includes instruction reception means for receiving an instruction from an external unit, maximum value calculation means for calculating a maximum value that can be output, required value determination means for determining a value required of the other control sub-units in accordance with the difference between the maximum value and the instruction, required value transmission means for transmitting the required value to the other control sub-units, required value reception means for receiving required values from the other control sub-units, execution judgment means for selecting either the maximum or the required value received by the required value reception means, whichever is smaller, and selected value execution means, which performs a process for generating the value selected by the execution judgment means.

According to another aspect of the present invention a control sub-unit includes off-leak measurement means for measuring an off-leak current of a power semiconductor, classification means for classifying in accordance with the off-leak current of the power semiconductor, drive condition change means for changing power semiconductor drive conditions in accordance with a classification result produced by the classification means, and drive condition notification means for notifying a control main unit of drive conditions that are changed by the drive condition change means.

Other and further objects, features and advantages of the invention will appear more fully from the following description.

DETAILED DESCRIPTION OF THE PREFERRED EMBODIMENTS

First Embodiment

Figure 1:
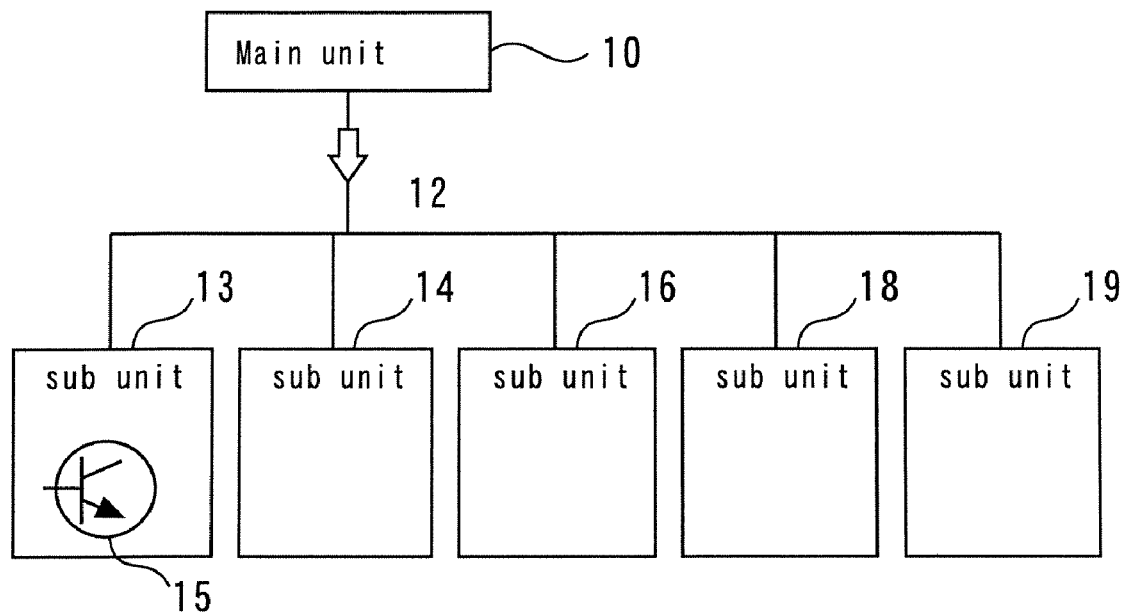
FIG. 1 illustrates an automobile control system according to a first embodiment of the present invention.

FIG. 1 illustrates an automobile control system according to a first embodiment of the present invention. The automobile control system includes a control main unit 10 (hereinafter referred to as the main unit 10) and control sub-units 13, 14, 16, 18, 19 (hereinafter referred to as the sub-units 13, 14, 16, 18, 19). The main unit 10 is connected to a communication line 12. The communication line 12 connects the main unit 10 to the sub-units 13, 14, 16, 18, 19 and establishes bidirectional communication. For example, the sub-units 13, 14, 16, 18, 19 are motor control devices, ATECUs (Automatic Transmission Electric Control Units), or engine ECUs. The present embodiment assumes that sub-unit 13 is a motor control device. Sub-unit 13 includes a power semiconductor 15. Sub-unit 13 provides motor control to permit the simultaneous use of a gasoline engine in a hybrid car.

Figure 2:
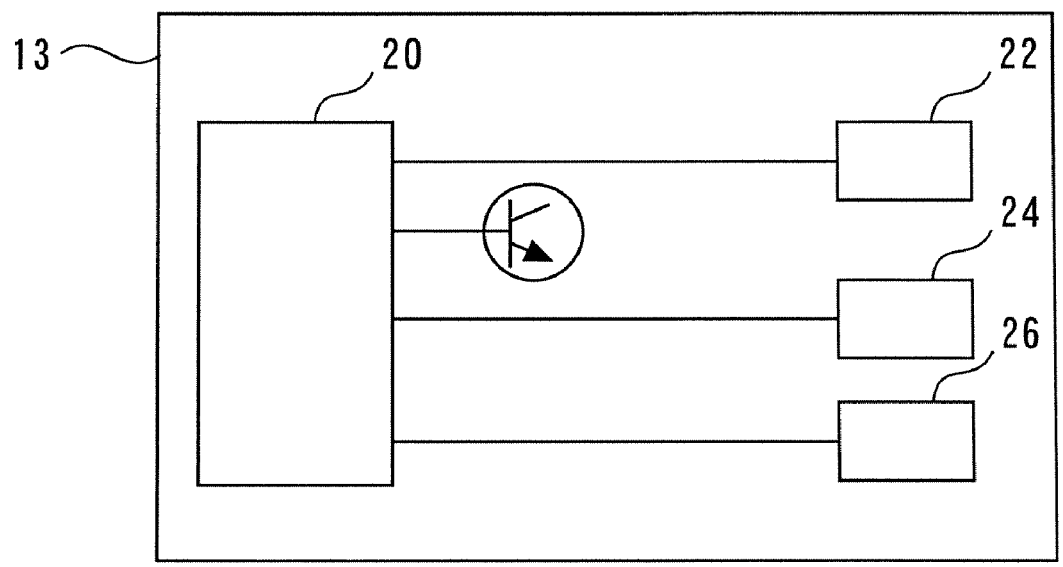
FIG. 2 is a conceptual diagram illustrating the configuration of sub-unit.

FIG. 2 is a conceptual diagram illustrating the configuration of sub-unit 13, which is shown in FIG. 1. Sub-unit 13 includes a temperature sensor 22, a current sensor 24, and a voltage sensor 26. These three sensors are connected to a semiconductor drive device 20. The semiconductor drive device 20 includes a communication device, a motor driver circuit, a control circuit, and a simulator.

Figure 3:
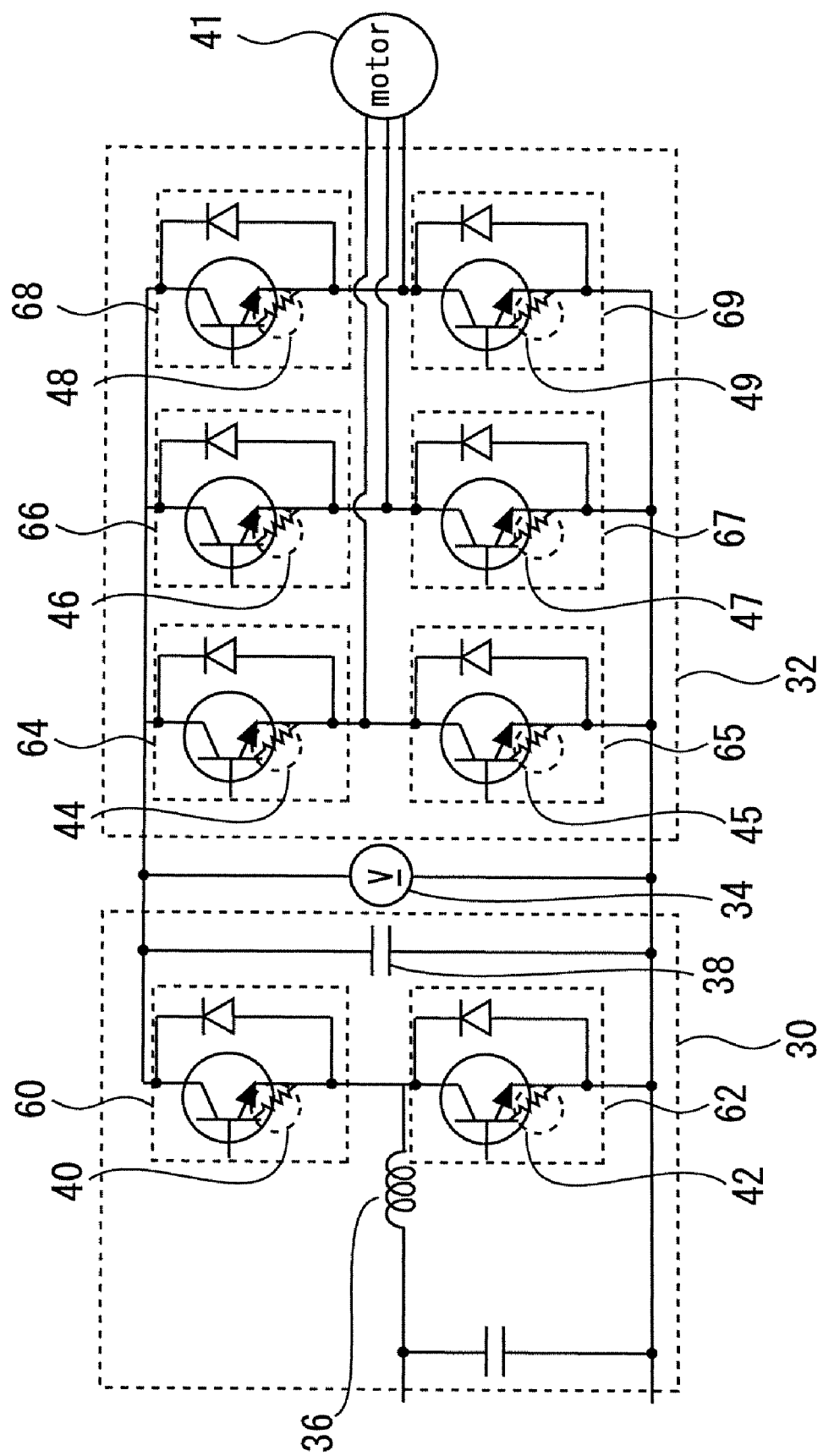
FIG. 3 illustrates the configuration of the motor driver circuit.

FIG. 3 illustrates the configuration of the motor driver circuit, which is included in the semiconductor drive device 20. The motor driver circuit includes a converter 30, which increases/decreases a voltage. The converter 30 includes a reactor 36. The reactor is a passive element that uses a winding. Switching circuits 60, 62 having a power device and a diode are positioned downstream of the reactor 36. The switch circuits 60, 62 include ammeters 40, 42, respectively. A capacitor 38 and a voltmeter 34 are connected in parallel with the downstream ends of the switch circuits 60, 62. The voltmeter 34 measures a voltage that is generated by the converter 30.

A three-phase AC inverter 32 is positioned downstream of the converter 30. The three-phase AC inverter 32 includes switch circuits 64, 65, 66, 67, 68, 69. As is the case with the aforementioned switch circuits 60, 62, switch circuits 64, 65, 66, 67, 68, and 69 include a power device and a diode. Further, switch circuits 64, 65, 66, 67, 68, and 69 include ammeters 44, 45, 46, 47, 48, 49, respectively. The three-phase AC inverter controls the current and frequency to be transmitted to a motor 41.

The motor 41 is controlled as an output whose voltage, current, and frequency are controlled by the configuration described above is transmitted to the motor 41. Further, this configuration enables switch circuits 60, 62, 64, 65, 66, 67, 68, and 69 to detect the current value of each switch circuit. Furthermore, the voltmeter 34 can detect the voltage applied to each of the switch circuits.

Figures 4, 5:
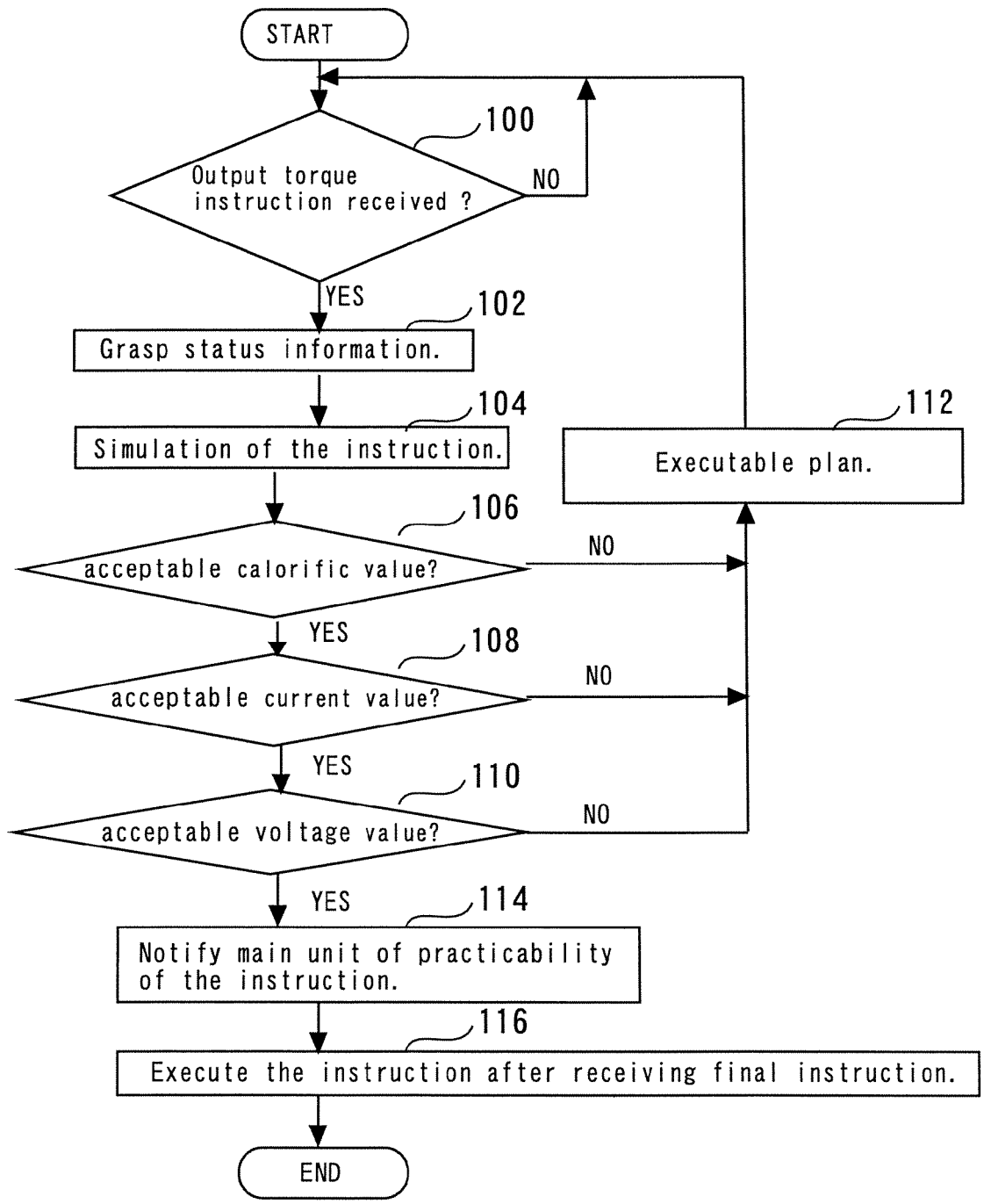
FIG. 4 is an external view of switch circuit.
FIG. 5 is a flowchart illustrating a process that sub-unit performs in accordance with the first embodiment.

FIG. 4 is an external view of switch circuit 60, which is shown in FIG. 3. In the present embodiment, switch circuit 60 is provided in the form of a chip. A temperature sensor 70 is mounted on an outer package wall of the chip. As is the case with switch circuit 60, switch circuits 62, 64, 65, 66, 67, 68, and 69 include a temperature sensor that is mounted on an outer wall of a chip.

In the automobile control system, which includes the main unit and sub-units, each sub-unit receives information from its own sensor to recognize its status. Further, each sub-unit executes an instruction that is issued by the main unit. The instruction issued by the main unit is determined without considering the status of each sub-unit. In other words, the main unit issues instructions without considering the status of each sub-unit. In this system, executing the instruction from the main unit may impair the ideal state of a sub-unit. The term "ideal state" refers to an operating state where standard values, which are determined in consideration of a normal sub-unit operation, are not exceeded by the values derived from a sensor in the sub-unit. The standard values for operating the sub-unit safely are determined for temperature, current, and voltage from the viewpoint of high temperature, overcurrent, and withstand voltage.

When the sub-unit deviates from the aforementioned ideal state, a control circuit in the sub-unit may formulate a judgment, shut off the power supply, and stop the sub-unit. Such a judgment is formulated in consideration, for instance, of system safety. When the power supply to the sub-unit is shut off in the above manner, no output is obtained from the sub-unit. Therefore, the system may reduce its output or stop operating.

When the sub-units 13, 14, 16, 18, 19 shown in FIG. 1 receive an instruction from the main unit 10, the present embodiment allows the sub-units to suspend the execution of the instruction and notify the main unit 10 of an executable plan. The main unit is notified of such an executable plan when a sub-unit grasps its status and concludes that the execution of the instruction from the main unit causes the sub-unit to deviate from the ideal state. In the present embodiment, the sub-units 13, 14, 16, 18, 19 can use the above method to avoid the execution of an instruction that will cause the sub-units to deviate from the ideal state. As a result, the sub-units 13, 14, 16, 18, 19 can maintain their ideal state.

Upon receipt of the executable plan, the main unit 10 according to the present embodiment issues an instruction again to the sub-units 13, 14, 16, 18, 19 while retaining the received executable plan. If, for instance, only sub-unit 13 notifies the main unit 10 of an executable plan, an instruction is issued again so that the output difference between the initial instruction and executable plan is added to instructions other than that for sub-unit 13. In this manner, the main unit 10 according to the present embodiment can reissue instructions to let the system generate a desired output while retaining the executable plan. Keeping the system powered in the above manner is meaningful particularly in a situation where a vehicle carrying the control main unit and control sub-units is used in a cold region, desert, or other stringent environment. In other words, a target torque value can be changed to continuously operate the system and save the driver from being isolated due to an immobile vehicle.

FIG. 5 is a flowchart illustrating a process that sub-unit 13 performs in accordance with the present embodiment. Although the process performed by sub-unit 13 will now be described, the other sub-units perform the same process as sub-unit 13. First of all, sub-unit 13 judges whether an output torque instruction is received from the main unit 10 (step 100). The output torque instruction is received with the communication line 12 shown in FIG. 1. If sub-unit 13 judges that an output torque instruction is received, sub-unit 13 grasps its status (step 102). The status of sub-unit 13 is grasped by acquiring information from the sensors 22, 24, 26 shown in FIG. 2. Next, step 104 is performed to simulate the execution of the instruction issued by the main unit. The simulation is performed by a simulator that is included in the semiconductor drive device 20 shown in FIG. 2. The simulator performs the simulation to verify the result of instruction execution by using the status grasped in step 102 as basic data.

After the simulation was performed in step 104, steps 106, 108, and 110 are performed to judge whether the execution of the instruction will cause a calorific value, current value, and voltage value to exceed predetermined standard values. The standard values are defined to assure safe system operations as described earlier. The standard values are set within the semiconductor drive device 20 shown in FIG. 2. If the judgment result obtained in step 106, 108, or 110 indicates that a standard value will be exceeded, the main unit is notified of an executable plan (step 112). The executable plan is the information about a torque value that sub-unit 13 can output while satisfying the standard values in consideration of its status. When sub-unit 13 notifies the main unit 10 of the executable plan, the main unit issues an instruction on the assumption that the executable plan is retained. Upon receipt of the instruction, sub-unit 13 repeats steps 100 and beyond.

If the judgment results obtained in steps 106, 108, and 110 indicate that the temperature, current, and voltage standard values are not exceeded by the received instruction, sub-unit 13 notifies the main unit 10 that the instruction can be executed (step 114). Next, sub-unit 13 receives an instruction from the main unit. In this instance, either of two different instructions (instruction A or instruction B) may be received. Instruction A is received when the main unit received a notification indicated in step 114 in FIG. 5 from sub-unit 13 and all other sub-units. Instruction A permits the execution of the instruction associated with the notification sent in step 114. This instruction is referred to as the final instruction. The final instruction is issued simultaneously with final instructions for the other sub-units. Upon receipt of the final instruction, sub-unit 13 executes the instruction that is reported in step 114 as an executable instruction (step 116). Instruction B is received when the instruction for sub-unit 13 is to be changed in a situation where sub-units other than sub-unit 13 notified the main unit of an executable plan. Instruction B is a new instruction that differs from an instruction whose executability is judged through a simulation performed by sub-unit 13. When instruction B is received, sub-unit 13 reexecutes a routine shown in FIG. 5, which begins with step 100.

As described above, sub-unit 13 can remain in an ideal state by preventing itself from deviating from the ideal state because it simulates the execution of an instruction and executes the instruction only when it allows sub-unit 13 to operate safely.

Figure 6:
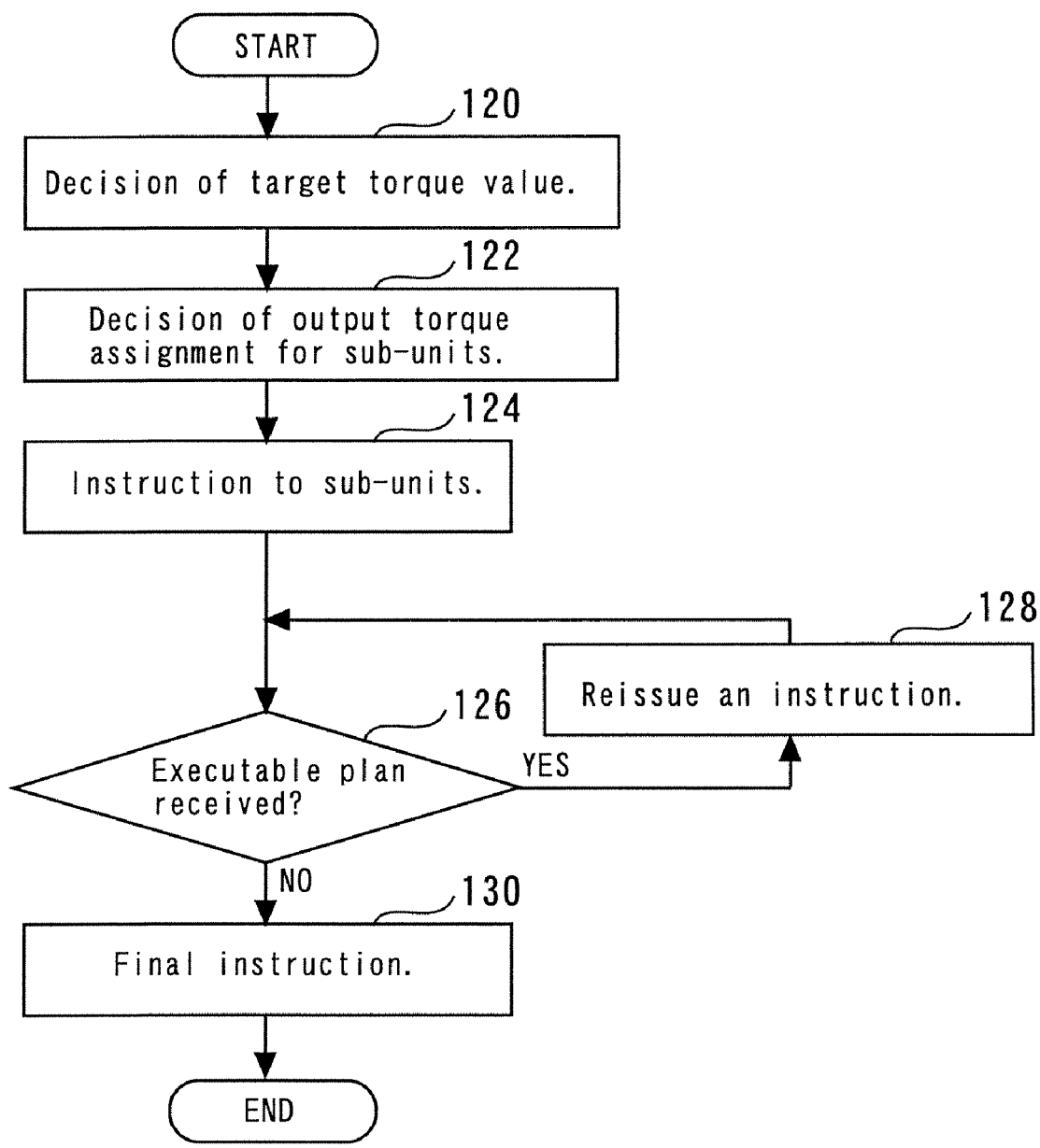
FIG. 6 is a flowchart illustrating a routine that the main unit executes to provide torque control.

FIG. 6 is a flowchart illustrating a routine that the main unit 10 executes to provide torque control. The present embodiment assumes that two or more of the sub-units 13, 14, 16, 18, 19 are related to torque. First of all, the main unit 10 performs step 120 to determine a target output torque value, which is to be achieved by the system. Next, the main unit 10 performs step 122 to study output torque assignments for the sub-units. The output torque assignments are studied in consideration of a fuel efficiency map. The fuel efficiency map is data that is used to determine the instructions to be issued to the sub-units for fuel efficiency enhancement purposes. Torque value instructions determined according to the fuel efficiency map are conveyed to the torque-related sub-units (step 124).

Upon receipt of the instructions, which were issued in step 124, the torque-related sub-units respond as indicated in the flowchart shown in FIG. 5. The main unit receives responses from the torque-related sub-units and recognizes whether there are executable plans (step 126). If the main unit 10 receives an executable plan from one or more of the torque-related sub-units, the main unit 10 performs step 128 to reissue an instruction while retaining the executable plan. The reissued instruction is formulated on the assumption that the executable plan is retained. The difference between the initial instruction and executable plan is then added as a weight for sub-units that did not notify the main unit of an executable plan. The above weighting operation is performed in consideration of the aforementioned fuel efficiency map. Even if any sub-unit notifies the main unit of an executable plan as described above, the system can be continuously powered by causing the other sub-units to compensate for the difference between the initial instruction and executable plan.

When all sub-unit responses to the instruction issued by the main unit 10 indicate that the instruction can be executed, the main unit 10 issues a final instruction to the sub-units (step 130). As mentioned earlier, the final instruction is an instruction that permits the sub-units to execute the instruction. Issuing the final instruction terminates the routine executed by the main unit, which is shown in FIG. 6.

As described earlier, the main unit 10 according to the present embodiment can reissue an instruction while retaining an executable plan presented by a sub-unit.

The present embodiment assumes that the sub-units control an output torque. However, the present invention is not limited to the use of such a configuration. The present invention can be applied to a situation where the system includes the main unit and sub-units and allows a plurality of sub-units to mutually complement their functions. The same advantages as described above can also be obtained when, for instance, electric power steering and vehicle posture control systems are furnished as sub-units to provide steering system control.

Second Embodiment

A second embodiment of the present invention will now be described. The second embodiment relates to a control main unit that requires a shorter period of control determination than the control main unit according to the first embodiment.

The second embodiment has the same configuration as the first embodiment.

Even when an executable plan is recognized by the main unit 10, the first embodiment reissues an instruction that retains the target torque determined in step 120, which is shown in FIG. 6. When an instruction retaining the target torque is repeatedly issued, the sub-units may continuously present an executable plan, thereby increasing the time required before the issue of a final instruction. Delaying the issue of the final instruction may cause a problem for the system in which prompt control judgment is called for.

The second embodiment permits the main unit to change the target torque. This change is effected when an executable plan is received by the main unit a predetermined number of times. Instructions concerning the changed target torque can be immediately executed by all sub-units. Upon receipt of the instructions concerning the changed target torque, therefore, the sub-units notify the main unit that the instructions can be executed. Consequently, actual control is immediately executed. Thus, the present embodiment can avoid a delay in the final control judgment.

Figure 7:
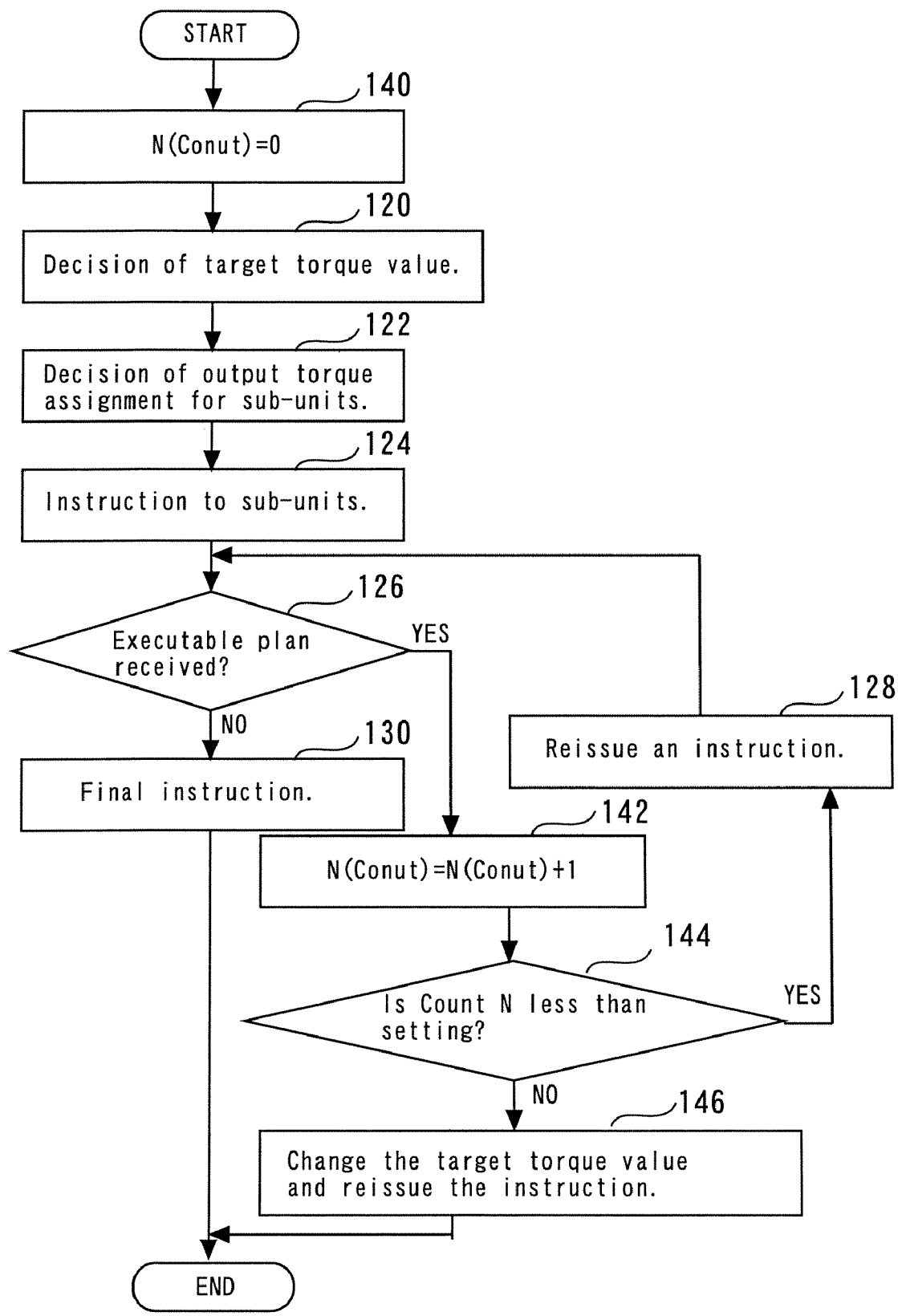
FIG. 7 is a flowchart illustrating a routine that is executed by the main unit according to the second embodiment.

FIG. 7 is a flowchart illustrating a routine that is executed by the main unit 10 according to the present embodiment. Steps 120, 122, 124, 126, 128, and 130, which are shown in FIG. 7, will not be described in detail because they are the same as the counterparts that were described in conjunction with the first embodiment and with reference to FIG. 6. First of all, the count N of a counter is reset to 0 in step 140. The count N of the counter indicates the number of times an executable plan was received by the main unit 10. In other words, the count N of the counter indicates the number of times the instruction issued by the main unit was not accepted by a sub-unit. Processing then proceeds to steps 120, 122, and 124 to determine the target torque, study the instructions for the sub-units, and issue control instructions to the sub-units. Next, the main unit 10 performs step 126 to judge whether there is an executable plan. If, in step 126, all sub-units notify the main unit 10 that the received instruction can be executed, the main unit 10 issues a final instruction as is the case with the first embodiment and terminates the routine (step 130).

If, on the other hand, the main unit 10 recognizes an executable plan in step 126, step 142 is performed to increment the count N of the counter from 0 to 1. Next, step 144 is performed to judge whether the count N of the counter, which was incremented in step 142, is less than a setting. A setting is a predetermined value. If the judgment result obtained in step 144 indicates that the count N of the counter is less than the setting, step 128 is performed to reissue an instruction while retaining the executable plan received in step 126 and repeat the preceding steps. If, on the other hand, the judgment result obtained in step 144 indicates that the count N of the counter is not less than the setting, processing proceeds to step 146. Step 146 is performed to change the target torque value to be achieved by the main unit. This change is made while retaining the executable plan so that the change can be immediately effected by the sub-units. Therefore, the target change in step 146 contributes toward control judgment speedup and system operation continuation. One of some typical advantages provided by changing the target value as described above is as described below. In a cold region, desert, or other stringent environment, it is sometimes necessary to operate the system continuously by causing the main unit to decrease its initial target torque value. Performing step 146 in such a situation to change the target value and continue the system operation contributes to the assurance of driver safety. In step 146, an instruction determined according to the changed target torque value is also issued to the sub-units. Since the instruction retains an executable plan, the sub-units notify the main unit that the instruction can be immediately executed. In response to such a notification, the main unit issues a final instruction in step 130. As a result, all the sub-units exercise control in accordance with the executable plan.

As described above, the present embodiment uses a setting to limit the number of times a control adjustment process is to be performed between the main unit and sub-units. This limiting function makes it possible to avoid unnecessary repetitions of the control adjustment process and promptly issue the final instruction. The present embodiment assumes that a setting of 5 is employed. This value is equal to the number of sub-units. Using a setting of 5, which equals to the number of sub-units, provides the following advantage. If each sub-unit returns an executable plan in response to an instruction issued by the main unit, the instruction needs to be issued 5 times to receive an executable plan from each unit. In other words, the maximum number of times the instruction needs to be issued to let all sub-units return an executable plan is 5. Even if the instruction retaining the initial target is issued more than 5 times in a situation where an executable plan is returned from all sub-units, the final instruction will not basically be issued. Therefore, when the setting is equal to the number of sub-units, it is possible to avoid the issue of an unnecessary instruction and expedite control judgment while achieving the initial control target wherever possible.

Although the present embodiment assumes that the setting is 5, the present invention is applicable to a situation where the setting is smaller than 5. The setting can be determined as appropriate depending on the degree of promptness required for control judgment after understanding the meaning of the setting, which is described above.

The present embodiment uses a setting to limit the number of times the control adjustment process is to be performed between the main unit and sub-units. However, the control target value may be changed when the executable plan is returned from all sub-units. This makes it possible to eliminate the necessity for repeatedly issuing an instruction until the count N of the counter reaches the setting in a situation where all sub-units return an executable plan in response to the first instruction issued by the main unit.

Third Embodiment

A third embodiment of the present invention will now be described. The third embodiment relates to control sub-units that are capable of processing a plurality of instructions and promptly formulating a control judgment, and to a control main unit.

The third embodiment has the same configuration as the first embodiment.

In the first embodiment, the main unit issues an instruction, and the sub-units judge whether the instruction is executable and returns a notification to the main unit. If, in this instance, instructions are to be studied one by one, it may be necessary to increase the number of communications between the main unit and sub-units. If a large number of communications are required before the formulation of an appropriate control judgment, it may be difficult to provide prompt control.

In the third embodiment, the main unit simultaneously transmits a plurality of instructions to the sub-units. The sub-units study the received instructions. When the sub-units judge that the instructions can be safely executed, the sub-units notify the main unit of such executable instructions, which can be safely executed. Upon receipt of the executable instructions from the sub-units, the main unit calculates an optimum combination within a range of the executable instructions. The optimum combination is then conveyed to the sub-units as a final instruction. The sub-units execute the received final instruction. As described above, the present embodiment can reduce the number of communications between the main unit and sub-units because the sub-units judge whether a plurality of plans are executable. Consequently, a control judgment can be promptly formulated. Further, since the sub-units execute the optimum combination, it is also possible to maintain a good condition from the viewpoint of fuel efficiency and control status safety.

Figure 8:
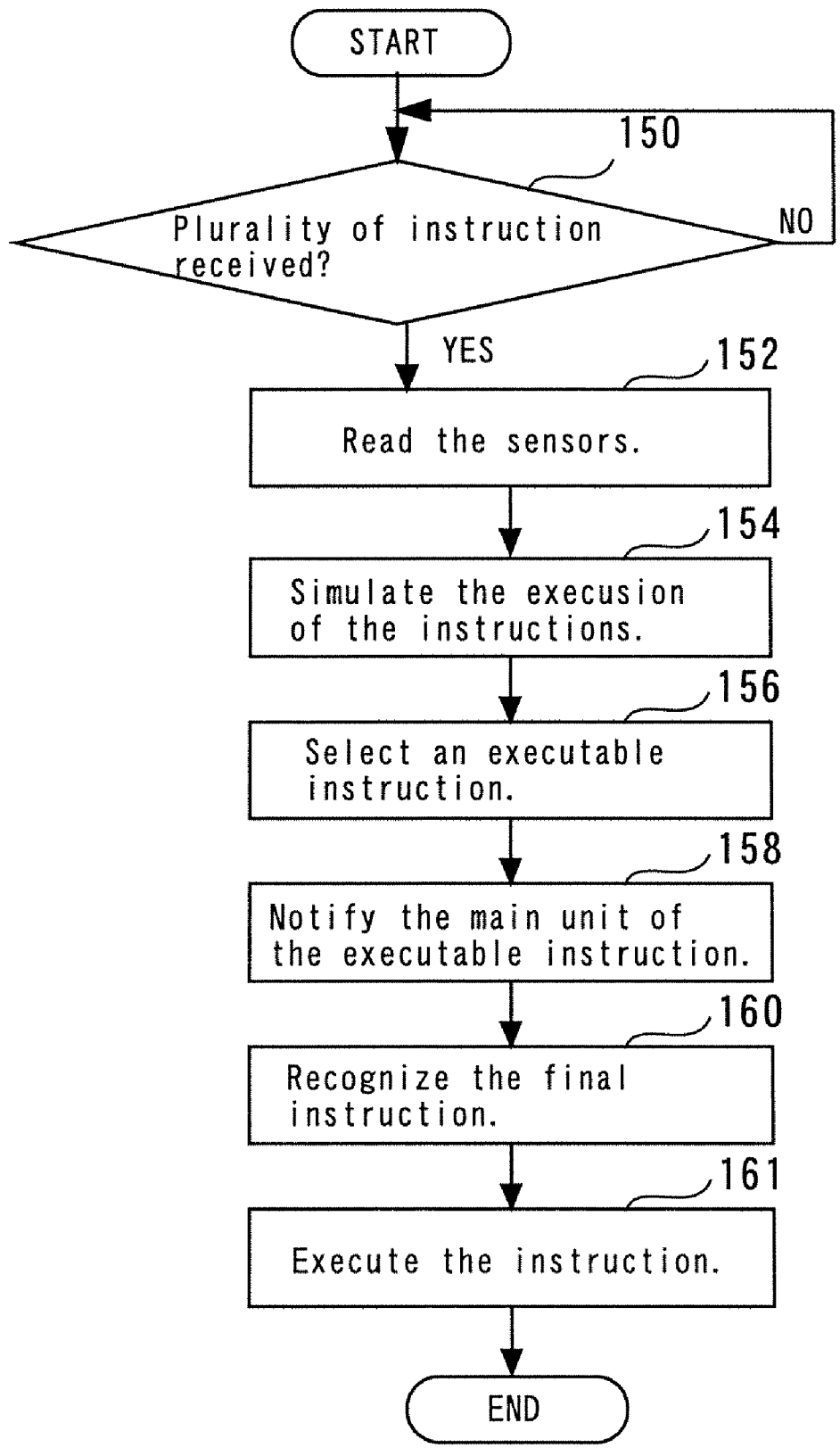
FIG. 8 is a flowchart illustrating a routine that is executed by sub-unit in accordance with the third embodiment.

FIG. 8 is a flowchart illustrating a routine that is executed by sub-unit 13 in accordance with the present embodiment. First of all, sub-unit 13 receives a plurality of instructions from the main unit 10 (step 150). Upon receipt of the plurality of instructions, sub-unit 13 reads the sensors 22, 24, 26 to grasp its status (step 152). Next, sub-unit 13 simulates the execution of the instructions in accordance with the grasped status (step 154). The simulation is performed by the simulator built in the semiconductor drive device 20. Next, step 156 is performed in accordance with the result of the simulation to select an executable instruction that can be safely executed. Step 158 is then performed to notify the main unit of the executable instruction that was selected in step 156. The main unit 10 issues a final instruction to indicate that the execution of the particular executable instruction is permitted. Sub-unit 13 recognizes and executes the final instruction, and then terminates the routine (steps 160 and 161).

Figure 9:
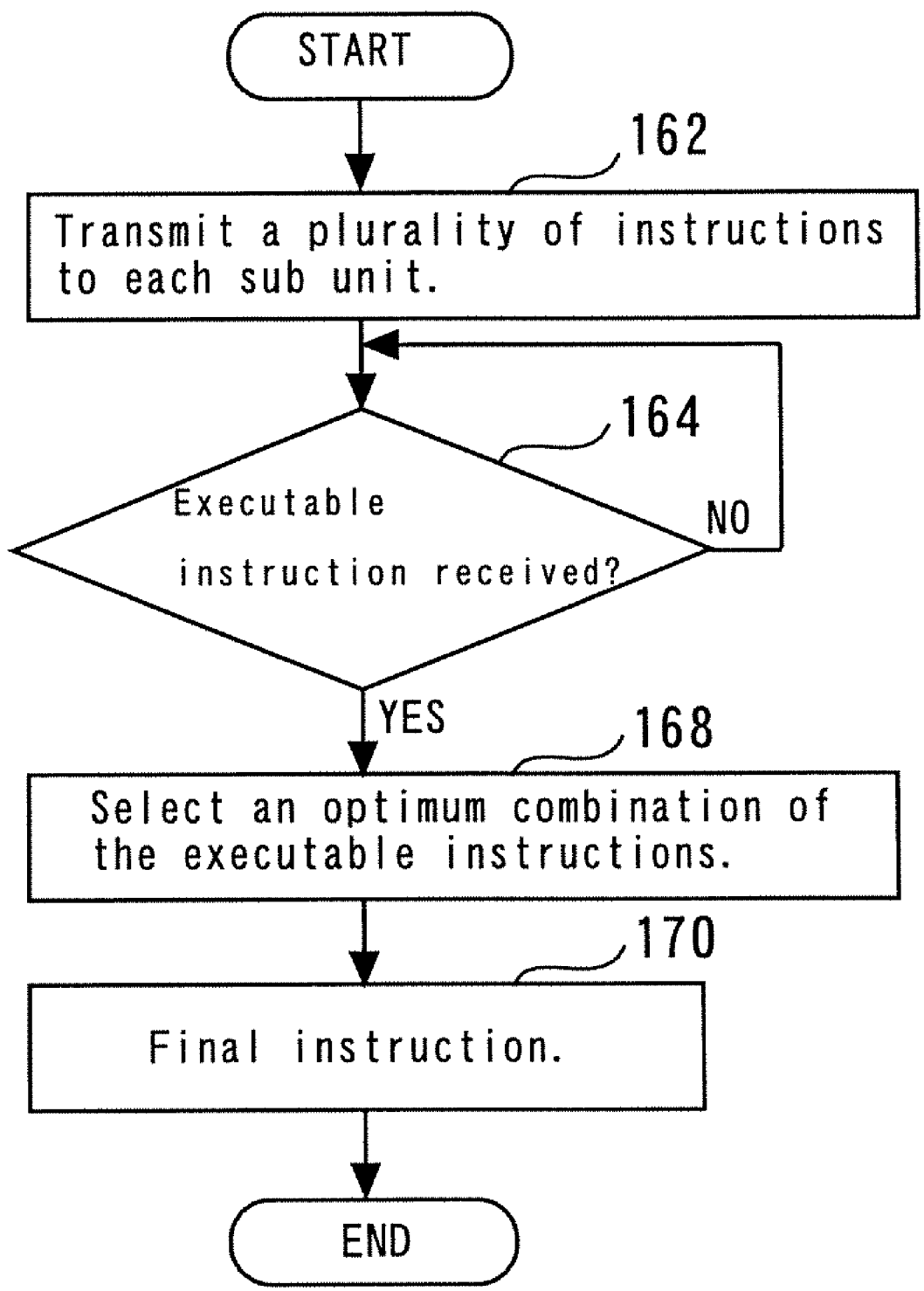
FIG. 9 is a flowchart illustrating a routine that is executed by the main unit according to the third embodiment.

FIG. 9 is a flowchart illustrating a routine that is executed by the main unit 10 according to the present embodiment. The main unit 10 transmits a plurality of instructions to each sub-unit (step 162). Next, step 164 is performed to judge whether the executable instructions, which were determined in steps 150 to 158 in FIG. 8, are received. When the reception of the executable instructions is recognized in step 164, step 168 is performed to select an optimum combination of the executable instructions. This selection is made, for instance, to provide high fuel efficiency and safe operation. The result of the selection is conveyed to the sub-units as a final instruction (step 170).

In the present embodiment, the system, which includes the main unit and sub-units, handles a plurality of instructions to reduce the number of communications between the main unit and sub-units, thereby increasing the speed of control judgment. Further, the present embodiment causes the main unit to determine an optimum combination of the received executable instructions. This makes it possible to formulate a control judgment immediately. If it is judged that the combination determined by the main unit 10 will not possibly achieve the initial torque target value, the present embodiment changes the target value.

The present embodiment assumes that the sub-units notify the main unit of executable instructions in step 158. However, the present invention is applicable to a case where such a notification is not made. If such a notification is not made, the sub-units execute the executable instructions. In this manner, control can be exercised at an increased speed when the notification in step 158 is omitted.

The present embodiment assumes that the main unit selects a combination in step 168. Alternatively, however, the main unit may reissue a plurality of instructions without selecting a combination. When this process is performed to reissue a plurality of instructions, it is possible to provide better control.

Fourth Embodiment

A fourth embodiment of the present invention will now be described. The fourth embodiment relates to control sub-units that are capable of changing instructions to provide safe, prompt control, and to a control main unit.

The fourth embodiment has the same configuration as the first embodiment.

In the first to third embodiments, sub-unit control is generally exercised after a sub-unit sends a certain response to the main unit upon receipt of an instruction. However, if a sub-unit that has received an instruction sends a response to the main unit before the initiation of actual control, prompt control determination may be obstructed.

Upon receipt of an instruction, a sub-unit according to the fourth embodiment executes the instruction without sending its response to the main unit or formulates and executes a control scheme. The sub-unit notifies the main unit of control status after exercising the aforementioned control. Upon receipt of the notification, the main unit reissues an instruction to the sub-unit as needed. As described above, the present embodiment can promptly exercise actual control because no notification is sent to the main unit before control execution. Further, safe sub-unit operations are assured because the sub-units can formulate a control scheme from the viewpoint of safe operations.

Figure 10:
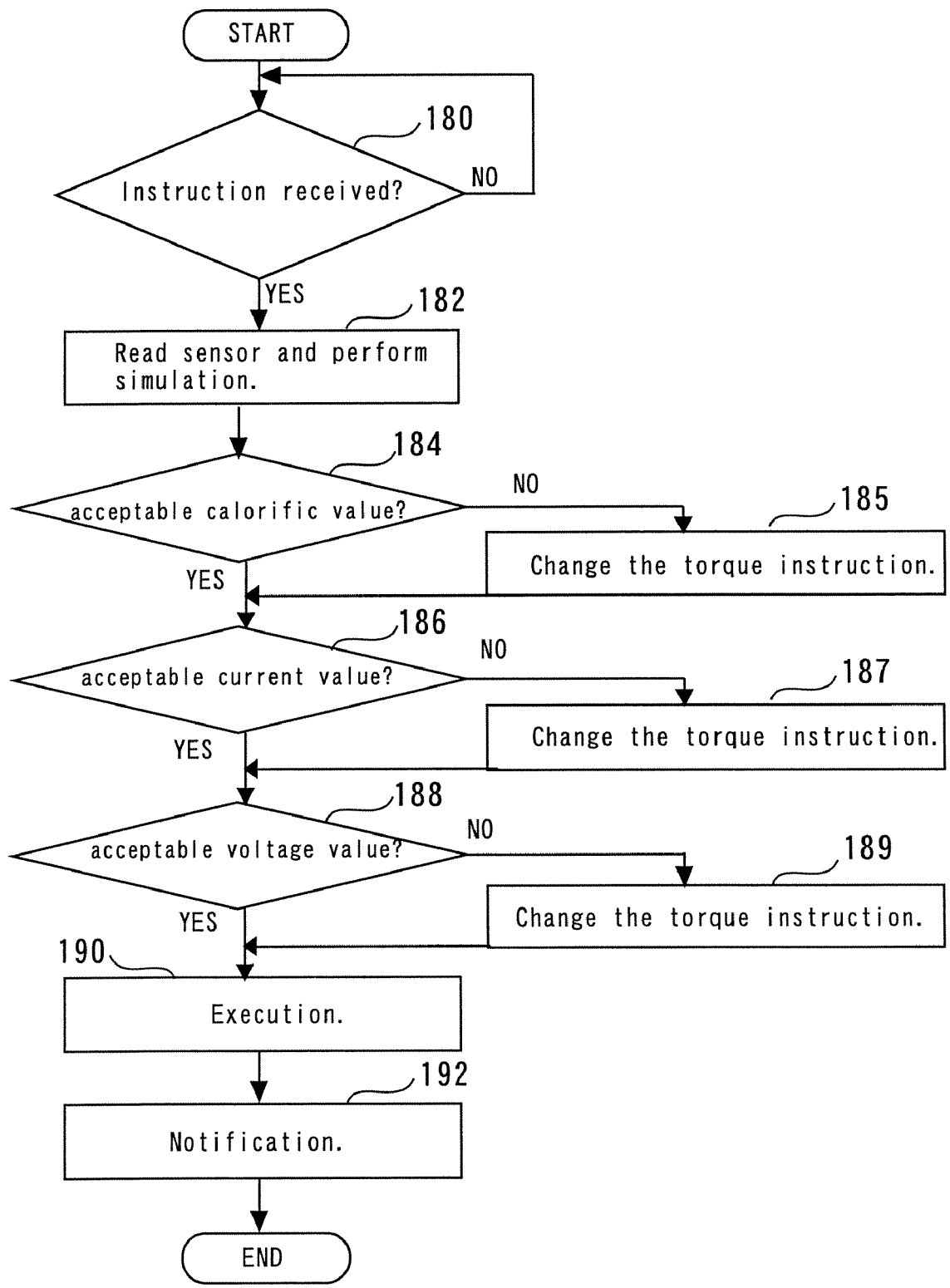
FIG. 10 is a flowchart illustrating a routine that is executed by sub-unit in accordance with the fourth embodiment.

FIG. 10 is a flowchart illustrating a routine that is executed by sub-unit 13 in accordance with the present embodiment. In step 180, sub-unit 13 recognizes that an instruction is received from the main unit. Sub-unit 13 then reads sensor values in order to grasp its status. Next, sub-unit 13 simulates the execution of the instruction in accordance with the read sensor values (step 182). Upon completion of simulation, sub-unit 13 performs step 184 to judge whether a standard value is exceeded by a calorific value that is calculated from the result of simulation. The standard value is the same as those defined in steps 106, 108, and 110 in FIG. 5. If the judgment result obtained in step 184 indicates that the standard value is not exceeded by the calorific value calculated from the result of simulation, sub-unit 13 retains the instruction and proceeds to step 186. If, on the other hand, the judgment result obtained in step 184 indicates that the standard value is exceeded by the calorific value, step 185 is performed to change the torque instruction to an instruction that does not exceed the standard value. In this instance, processing proceeds to step 186 after the instruction is changed in step 185. Step 186 is performed to judge whether a standard value is exceeded by a current value that is calculated from the result of simulation. If the judgment result obtained in step 186 indicates that the standard value is not exceeded by the current value, processing proceeds to step 188. If, on the other hand, the judgment result obtained in step 186 indicates that the standard value is exceeded by the current value, processing proceeds to step 187. Step 187 is performed to switch to an instruction for providing a current value that does not exceed the standard value. Step 188 is performed to judge whether a standard value is exceeded by a voltage value that is calculated from the result of simulation. If the judgment result obtained in step 188 indicates that the standard value is not exceeded by the voltage value, processing proceeds to step 190. If, on the other hand, the judgment result obtained in step 188 indicates that the standard value is exceeded by the voltage value, processing proceeds to step 189. Step 189 is performed to switch to an instruction for providing a voltage value that does not exceed the standard value. Upon completion of step 189, processing proceeds to step 190.

The torque instruction determined in the manner described above is executed in step 190. The instruction executed in step 190 is an instruction that can be safely executed for the sub-units because steps 184 to 189 have been completed. After the instruction is executed in step 190 for control purposes, step 192 is performed to notify the main unit of the execution.

Figure 11:
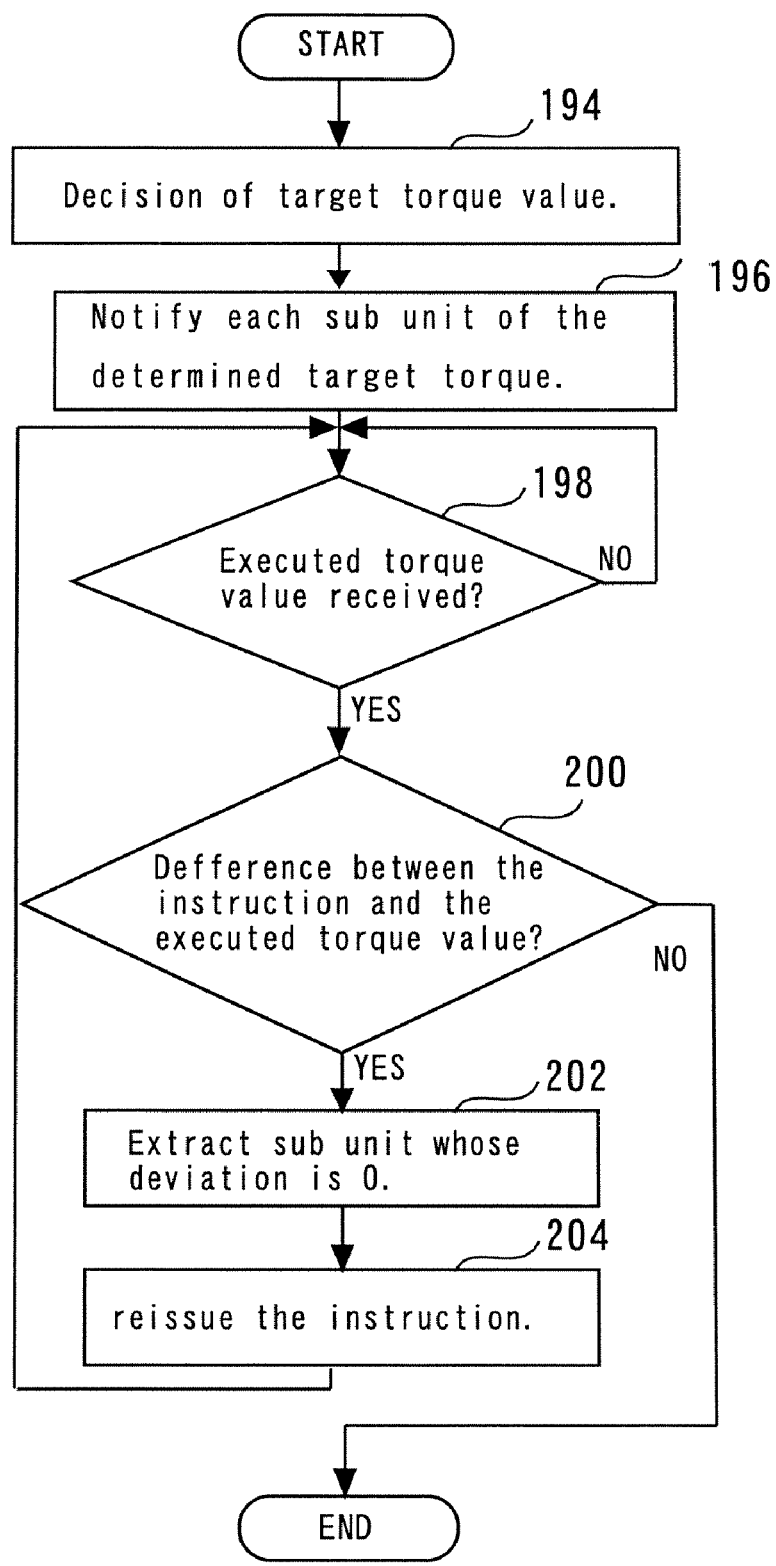
FIG. 11 is a flowchart illustrating a routine that is executed by the main unit according to the fourth embodiment.

FIG. 11 is a flowchart illustrating a routine that is executed by the main unit 10 according to the present embodiment. The main unit 10 determines a target torque (step 194). Next, the main unit notifies each sub-unit of the determined target torque (step 196). Each sub-unit then recognizes the reception of an actually executed torque value (step 198). After it is judged that the reception is recognized in step 198, step 200 is performed to judge whether there is a difference (hereinafter referred to as a deviation) between the torque value instruction issued in step 196 and the torque value recognized in step 198. This deviation check is performed in relation to each sub-unit. If the judgment result obtained in step 200 indicates that the deviation is 0 for all sub-units, the routine terminates because the instruction issued in step 196 is executed as is in each sub-unit. If, on the other hand, the judgment result obtained in step 200 indicates that the deviation is not 0 for all sub-units, it means that the initial instruction is not executed in some sub-units. In this instance, step 202 is first performed to extract sub-units whose deviation is 0. Next, step 204 is performed to reissue an instruction with the deviation recognized in step 200 assigned to sub-units having a deviation of 0, which were extracted in step 202. Subsequently, steps 198 and beyond are performed in relation to the reissued instruction.

As described with reference to FIGS. 10 and 11, the sub-units according to the present embodiment execute control upon receipt of an instruction without waiting for a second instruction from the main unit. Since this eliminates the time required, for instance, for communicating with the main unit, control can be promptly executed. Further, when an instruction issued by the main unit cannot be executed safely for some sub-units, the instruction is autonomously changed to ensure that the operation can be safely continued. Furthermore, the main unit reissues an instruction as needed to achieve an initial target torque wherever possible.

Fifth Embodiment

A fifth embodiment of the present invention will now be described. The fifth embodiment relates to control sub-units that are capable of reducing the load on a control main unit by autonomously determining and executing control, and to the control main unit that is used with the control sub-units.

The fifth embodiment has the same configuration as the first embodiment.

In the first to fourth embodiments, control executed by the sub-units is determined in accordance with an instruction issued by the main unit. This control mechanism is called a master-slave type. If the number of sub-units increases in a master-slave type control mechanism, the main unit has to transmit/receive an increased number of instructions and other communications. This may impose an excessive load on the main unit.

The system composed of sub-units and main unit according to the fifth embodiment employs a distributed autonomous control mechanism instead of the aforementioned master-slave type control mechanism. The distributed autonomous control mechanism is such that a plurality of sub-units autonomously determine a control policy after grasping the output value to be achieved by the system (hereinafter referred to as an overall target torque). In the distributed autonomous control mechanism, therefore, the main unit does not notify each sub-unit of a target torque (hereinafter referred to as an individual target torque), which is to be achieved individually by each sub-unit. Consequently, the load imposed on the main unit can be reduced.

Figure 12:
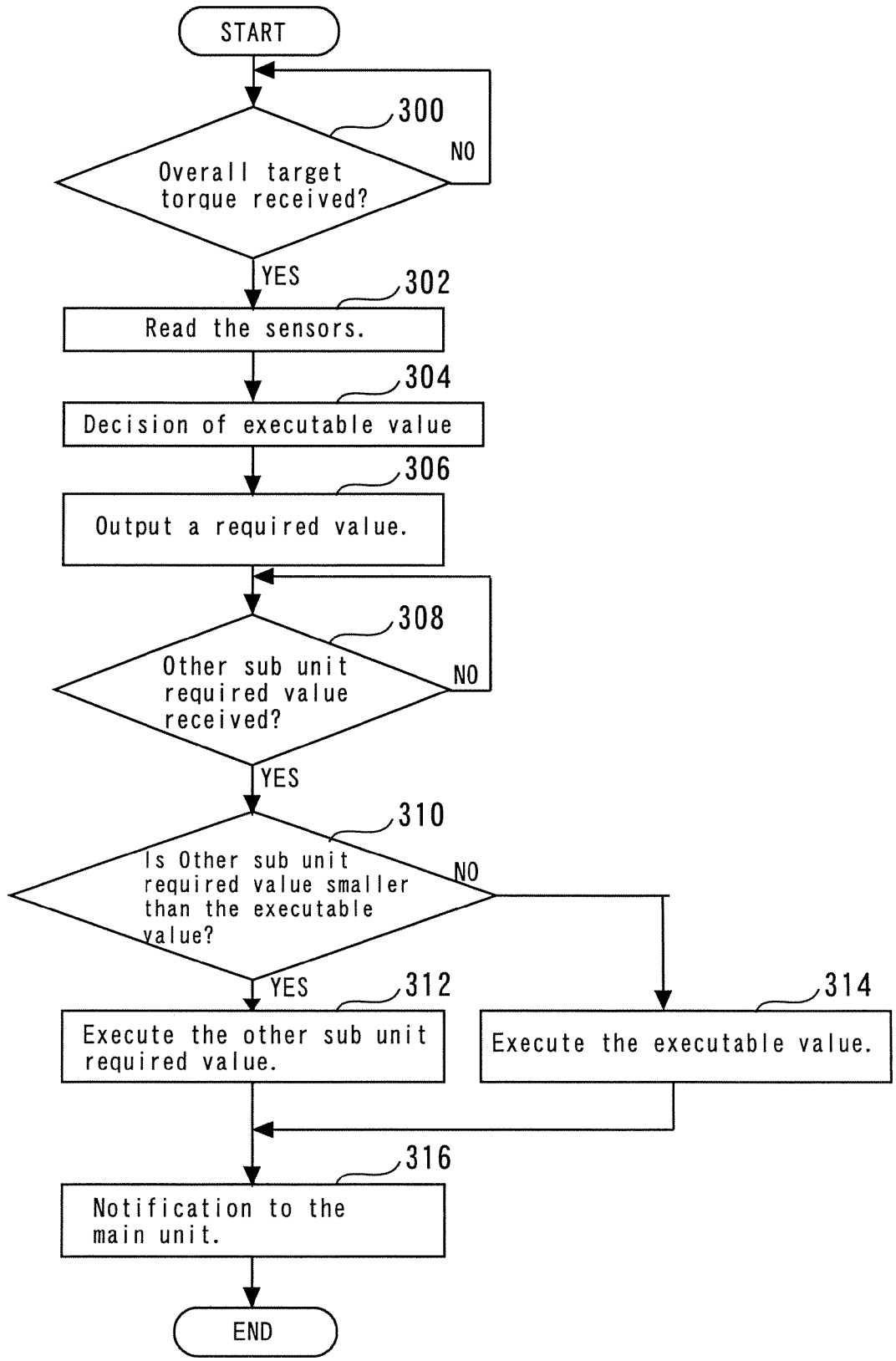
FIG. 12 is a flowchart illustrating a routine that is executed by sub-unit in accordance with the fifth embodiment.

FIG. 12 is a flowchart illustrating a routine that is executed by sub-unit 13 in accordance with the present embodiment. First of all, sub-unit 13 judges whether the overall target torque is transmitted from the main unit 10 (step 300). If the obtained judgment result indicates that the overall target torque is received, step 302 is performed to read the values of the temperature sensor 22, current sensor 24, and voltage sensor 26. In the next step (step 304), calculations are performed to determine an executable value in accordance with the read sensor values. The executable value is the maximum torque value that can be safely executed by sub-unit 13. Step 306 is then performed to output a required value that is determined from the difference between the overall target torque value received in step 300 and the aforementioned executable value. The required value is an assignment of the aforementioned difference to the other sub-units. Sub-unit 13 has a map for determining the assignment and determines the assignment in accordance with the map.

The routine described above is also executed by sub-units other than sub-unit 13. Therefore, sub-unit 13 receives a required value from the other sub-units (this value is hereinafter referred to as the other sub-unit required value). Step 308 is performed to judge whether the other sub-unit required value is received. If the obtained judgment result indicates that the other sub-unit required value is received, processing proceeds to step 310. Step 310 is performed to judge whether the other sub-unit required value is smaller than the executable value. If the other sub-unit required value is smaller than the executable value, step 312 is performed to execute the other sub-unit required value. In this instance, the overall target torque can be achieved when all sub-units execute the other sub-unit required value. If, on the other hand, the other sub-unit required value is greater than the executable value, step 314 is performed to execute the executable value. When the executable value is executed as described above in a situation where the other sub-unit required value is greater than the executable value, the safe operation of sub-unit 13 can be continued. Next, step 316 is performed to notify the main unit 10 of the execution in step 312 or 314.

Figure 13:
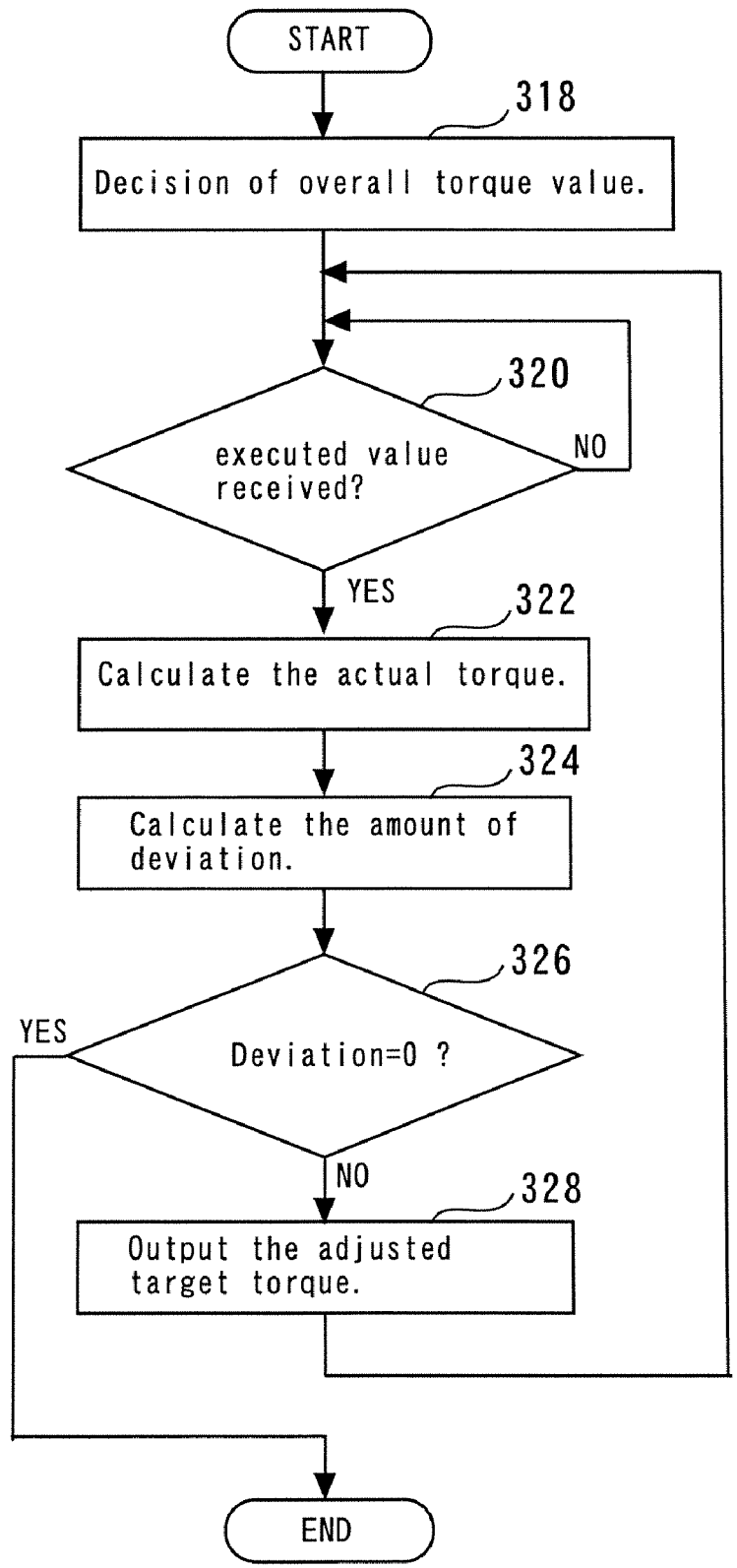
FIG. 13 is a flowchart illustrating a routine that is executed by the main unit according to the fifth embodiment.

FIG. 13 is a flowchart illustrating a routine that is executed by the main unit 10 according to the present embodiment. First of all, the main unit 10 determines a target torque (step 318). In the next step (step 320), the main unit 10 recognizes the reception of information about exercised control from each sub-unit. In accordance with the information received in step 320, the main unit 10 calculates a torque value that is achieved by the system (hereinafter referred to as the actual torque) (step 322). Next, step 324 is performed to calculate the amount of deviation between the target torque determined in step 318 and the actual torque. Next, step 326 is performed to judge whether the deviation is 0. If the obtained judgment result indicates that the deviation is 0, the routine terminates because the target torque is achieved. If, on the other hand, the obtained judgment result indicates that the deviation is not 0, the target torque is not achieved. In this instance, an adjusted target torque is output to each sub-unit (step 328). The adjusted target torque is a target torque that is adjusted by the main unit 10 for the purpose of causing the sub-units to achieve the initial target torque. The adjusted target torque is determined as described below. The employed adjusted target torque is higher than the target torque so that the target torque will be achieved. When the adjusted target torque is determined in this manner, the target torque can be achieved. After step 328 is performed to output the adjusted target torque, processing returns to step 320 so that the main unit 10 repeats the process described above.

As described with reference to FIGS. 12 and 13, the present embodiment is such that actual control is autonomously determined by the sub-units after the overall target torque is transmitted from the main unit to the sub-units. The load on the main unit can then be reduced. Further, the main unit can achieve the target torque by calculating the difference between the actual torque and overall target torque and issuing an adjusted target torque instruction. Furthermore, the sub-units according to the present embodiment mutually transmit and receive the required value. This enables the sub-units to achieve the overall target torque wherever possible and continue with a safe operation.

Sixth Embodiment

A sixth embodiment of the present invention will now be described. The sixth embodiment relates to control sub-units that achieve the overall target torque with high accuracy by selecting and executing a required value from another sub-unit in order of priority, and to a control main unit that is used with the control sub-units.

The sixth embodiment has the same configuration as the first embodiment except that each sub-unit includes a neural network, which determines the order of priority.

A sub-unit according to the fifth embodiment compares one other sub-unit required value against an executable value before execution. In other words, a sub-unit according to the fifth embodiment cannot select the most appropriate one of a plurality of other sub-unit required values for the purpose of achieving the overall target torque. In this situation, it is conceivable that the overall target torque may not be achieved because a sub-unit cannot execute an appropriate other sub-unit required value.

The sub-units according to the sixth embodiment select one other sub-unit required value from a plurality of other sub-unit required values received from the other sub-units in a determined order of priority and execute the selected other sub-unit required value. The order of priority is the information that the sub-units use to select and execute one of a plurality of other sub-unit required values with a view toward achieving the overall target torque. The order of priority is determined by the neural network included in each sub-unit. This enables each sub-unit to execute a required value that achieves the overall target torque. In the present embodiment, the main unit generates an enforcement signal for correcting the computation method used by the neural network in order to achieve the overall target torque. The enforcement signal enables the neural network to make an appropriate selection for achieving the overall target torque. Consequently, the present embodiment can achieve the overall target torque with high accuracy.

Figure 14:
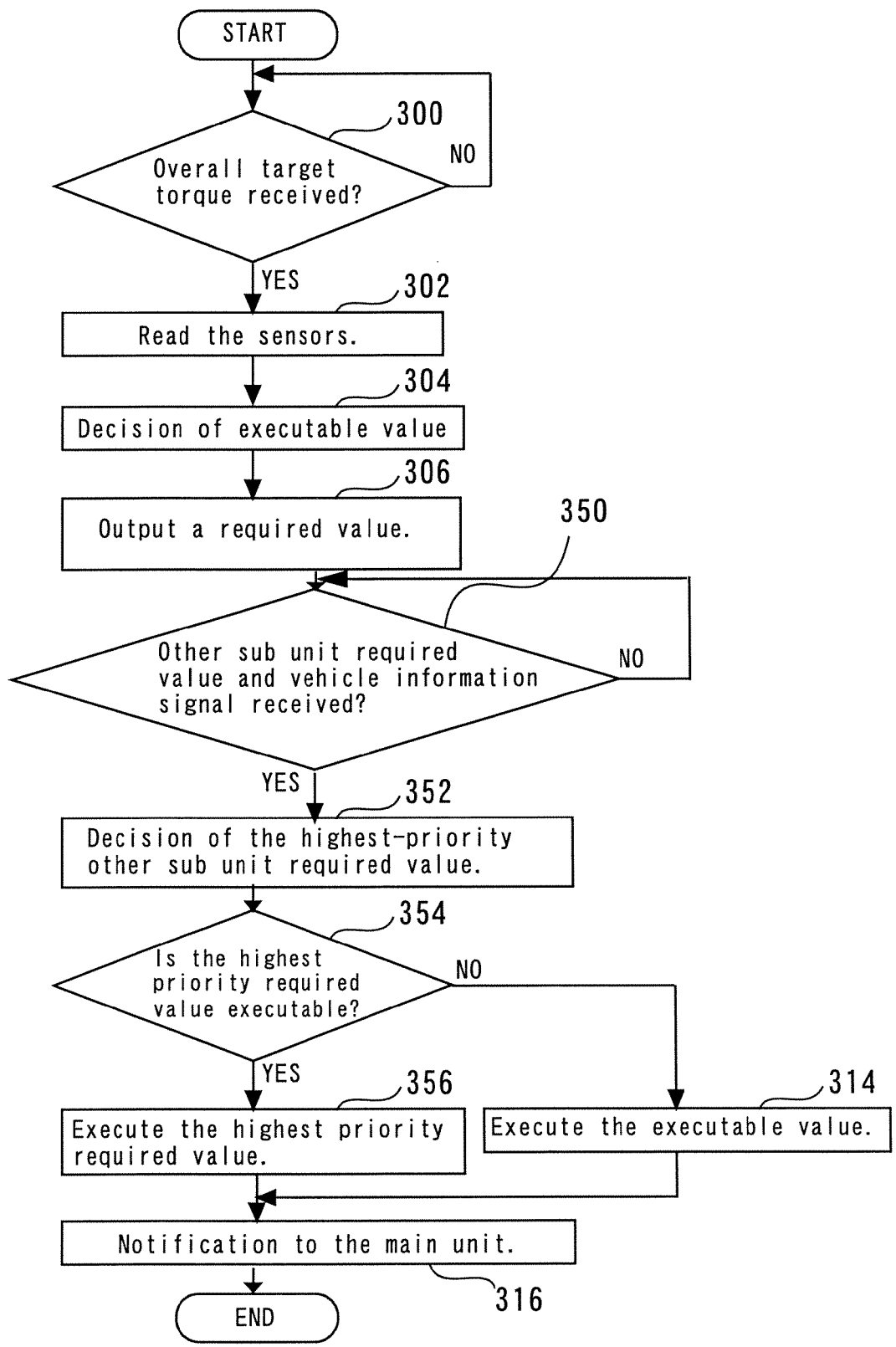
FIG. 14 is a flowchart illustrating a routine that sub-unit executes in accordance with the sixth embodiment.

FIG. 14 is a flowchart illustrating a routine that sub-unit 13 executes in accordance with the present embodiment. Steps 300, 302, 304, 306, 314, and 316, which are shown in FIG. 14, will not be described in detail because they are the same as the counterparts described in conjunction with the fifth embodiment. First of all, sub-unit 13 judges whether overall target torque information is received from the main unit 10 (step 300). If the obtained judgment result indicates that the overall target torque information is received, sub-unit 13 reads the sensor values (step 302) and then determines an executable value (step 304). Further, sub-unit 13 determines required values for the other sub-units and outputs the determined required values to the other sub-units (step 350). Subsequently, step 350 is performed to judge whether the other sub-unit required values and a vehicle information signal are received. The vehicle information signal is the information about parameters for determining the other sub-unit required value to be preferentially executed. The parameters carry the information about vehicle status, which includes, for instance, vehicle speed, steering angle, and power device voltage, current, and temperature.

Figure 16:
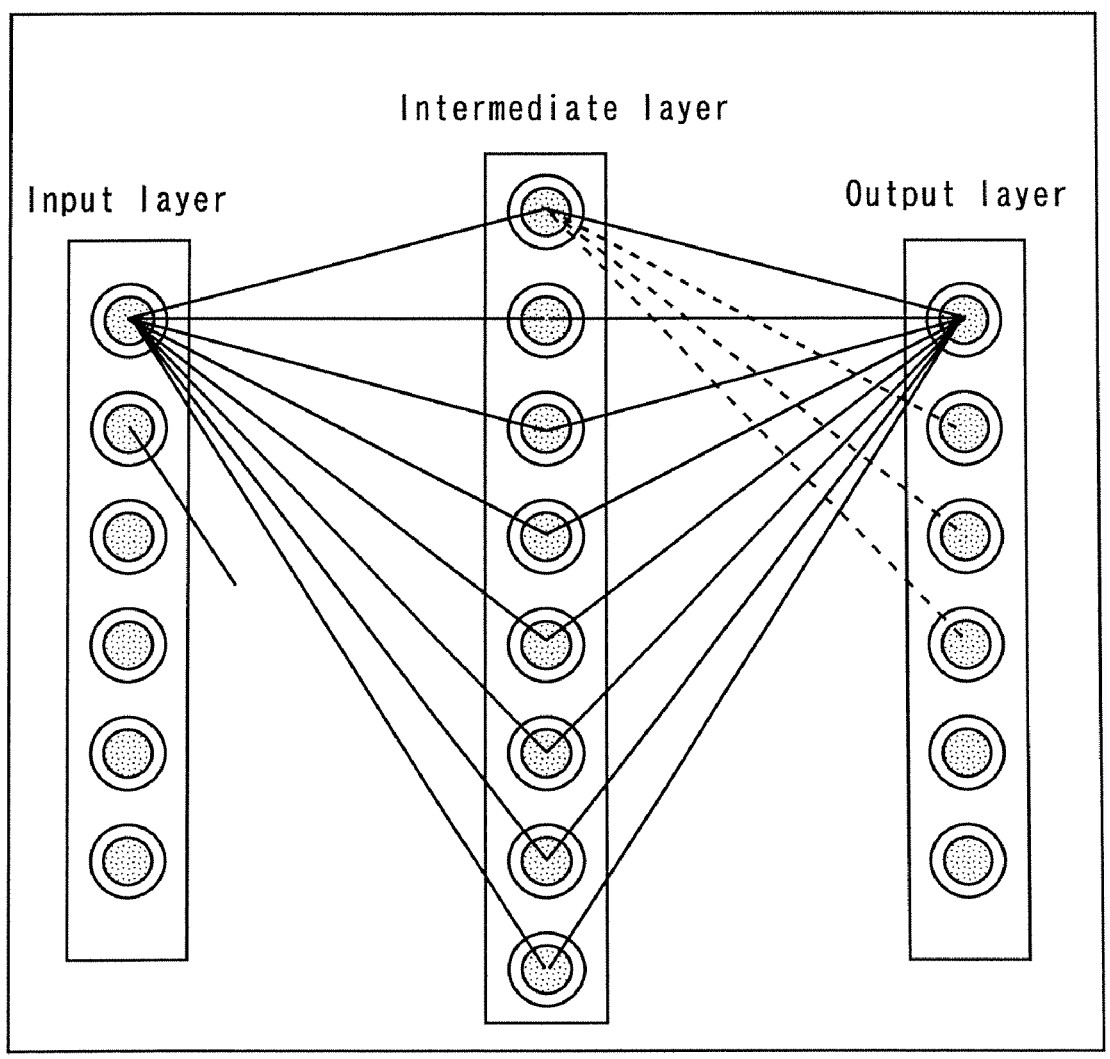
FIG. 16 illustrates neural network.

If the judgment result obtained in step 350 indicates that the other sub-unit required values and vehicle information signal are received, the vehicle information signal enters an input layer of the neural network, which is shown in FIG. 16. Next, the highest-priority other sub-unit required value is determined in accordance with the vehicle information signal (step 352). The highest-priority required value is determined by the neural network shown in FIG. 16. The neural network includes an input layer, an intermediate layer, and an output layer. In the input layer, each piece of vehicle information is indicated by a shaded circle. When the vehicle information is conveyed from the input layer to the intermediate layer, each piece of vehicle information is multiplied by a weighted function (hereinafter referred to as function W1). Line segments joining the input layer to the intermediate layer and the intermediate layer to the output layer indicate that the vehicle information is multiplied by the weighted function. Function W1 and function W2, which will be described later, are defined so as to determine the other sub-unit required value to be preferentially executed in accordance with the vehicle information and with a view toward achieving the overall target torque. An intermediate layer value is conveyed to the output layer after being multiplied by function W2. An output layer value is either 0 or 1. The value 0 indicates that execution is to be suspended. The value 1 indicates that execution is performed preferentially. Shaded circles in the output layer represent outputs that relate to the other sub-unit required values. Therefore, sub-unit 13 judges that the other sub-unit required value marked "1" in the output layer is the highest-priority required value.

After step 352 is completed to determine the highest-priority required value, step 354 is performed to compare the highest-priority required value against the executable value. If the comparison indicates that the highest-priority required value is smaller than the executable value, the highest-priority required value is executed (step 356). When the highest-priority required value is executed, the system can achieve the overall target torque with high accuracy. If, on the other hand, the highest-priority required value is greater than the executable value, the executable value is executed (step 314).

Executing the executable value in the above instance assures a safe operation. Finally, step 316 is performed to notify the main unit 10 of the execution and terminate the routine.

Figure 15:
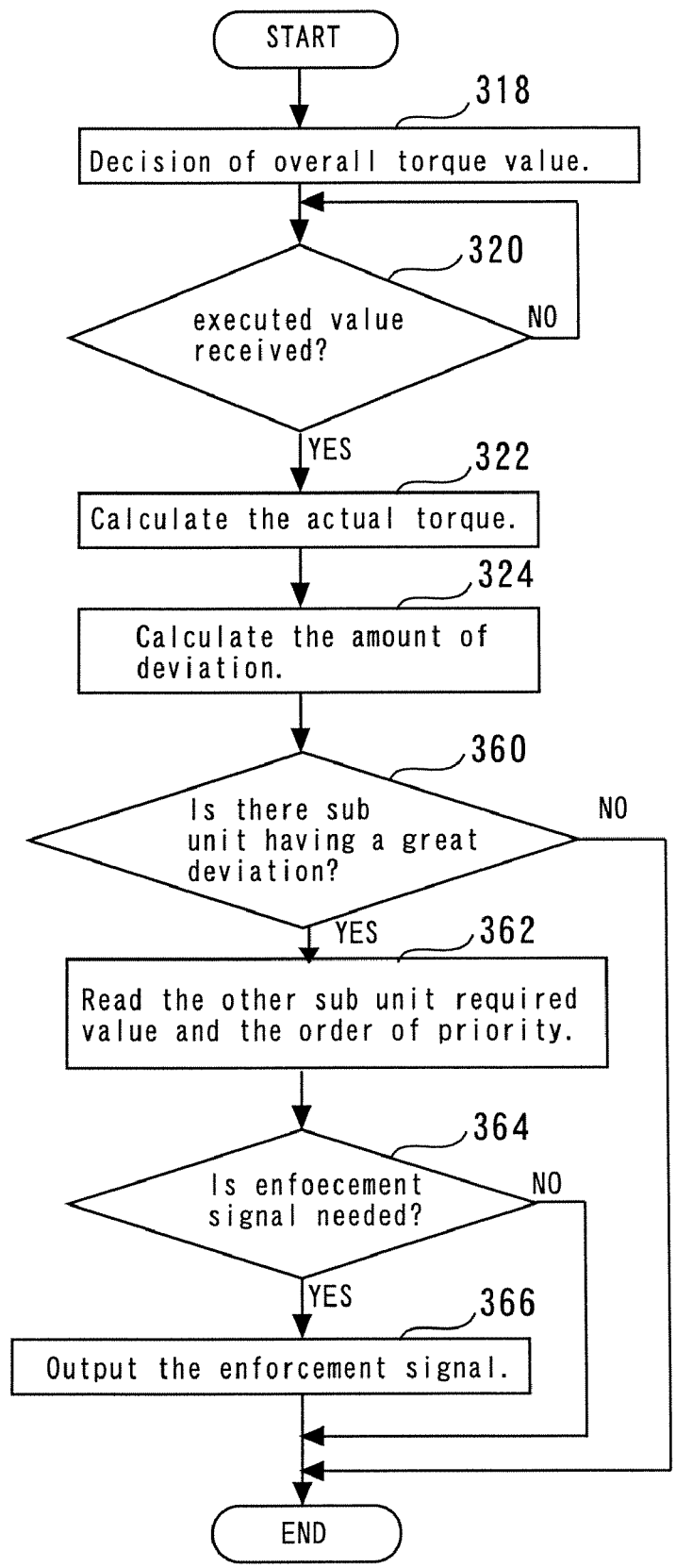
FIG. 15 is a flowchart illustrating a routine that is executed by the main unit according to the sixth embodiment.

FIG. 15 is a flowchart illustrating a routine that is executed by the main unit 10 according to the present embodiment. Steps 318, 320, 322, and 324 will not be described in detail because they are the same as the counterparts in FIG. 13. First of all, the main unit 10 determines the overall target torque (step 318). After judging that executed values are received from the sub-units, the main unit 10 calculates the actual torque (steps 320 and 322). Next, step 324 is performed to calculate the deviation between the overall target torque and actual torque. Step 360 is then performed to judge whether there is a sub-unit having a great deviation (a sub-unit whose deviation is greater than a standard value). The standard value is a predetermined value that is used as a reference for judging the magnitude of the deviation.

If the judgment result obtained in step 360 indicates that no sub-unit has a great deviation, the routine terminates because the overall target torque is achieved to a satisfactory extent. If, on the other hand, the judgment result obtained in step 360 indicates that there is a sub-unit having a great deviation, a process is performed to review a priority determination method for sub-units having a great deviation because it is conceivable that the order of priority was improperly determined. In this instance, step 362 is performed to read the other sub-unit required value received by the sub-unit having a great deviation and the information about the order of priority determined by the neural network of the sub-unit having a great deviation. Step 364 is then performed to judge in accordance with the information read in step 362 whether the enforcement signal should be transmitted to the sub-unit having a great deviation. If the judgment result obtained in step 364 indicates that the order of priority determined by the sub-unit having a great deviation is appropriate to achieve the overall target torque, the routine terminates without outputting the enforcement signal because functions W1 and W2 need not be changed. If, on the other hand, the judgment result obtained in step 364 indicates that the order of priority determined by the sub-unit having a great deviation is inappropriate to achieve the overall target torque, the enforcement signal is transmitted to the sub-unit having a great deviation (step 366). The enforcement signal indicates the order of priority that is found by the main unit to be appropriate. The value input into the input layer of the neural network when the order of priority is determined by the sub-unit having a great deviation is referred to as a great-deviation input. The output layer value for the great-deviation input is referred to as a great-deviation output. Upon receipt of enforcement signal, the neural network of the sub-unit having a great deviation changes functions W1 and W2 so that the contents of the enforcement signal are output in relation to the great-deviation input instead of the great-deviation output. Therefore, if an input equivalent to the great-deviation input is received after enforcement signal reception, the sub-unit having a great deviation generates the same output as the enforcement signal. As described above, the enforcement signal enables the neural network to determine the order of priority that is appropriate to achieve the overall target torque.

The present embodiment can achieve the overall target torque with high accuracy by determining the highest-priority other sub-unit required value in accordance with the vehicle information and preferentially executing the determined value. Further, the present embodiment achieves the overall target torque with enhanced accuracy by allowing the main unit to transmit the enforcement signal and the neural network to change functions W1 and W2 with a view toward proper judgment formulation.

Although the present embodiment uses the neural network to determine the order of priority, the present invention is not limited to the use of such a method. Any means of determining the order of priority may be used as far as it determines the order of priority in accordance with an input state. For example, a GA (genetic algorithm) may be used to determine the order of priority.

Seventh Embodiment

A seventh embodiment of the present invention will now be described. The seventh embodiment relates to control sub-units that autonomously suppress power loss.

Figure 17:
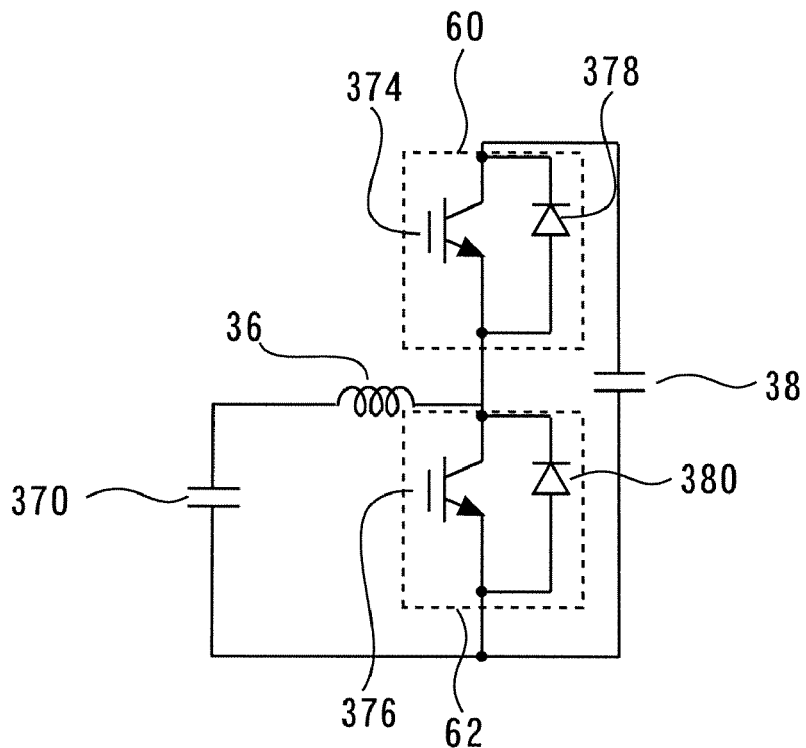
FIG. 17 illustrates booster system.

The seventh embodiment has the same configuration as the first embodiment. However, the present embodiment is characterized by the converter 30 (hereinafter referred to as the booster system) shown in FIG. 3. The booster system is illustrated in FIG. 17. For the sake of explanation, FIG. 17 shows a battery 370. The switch circuits 60, 62 include IGBTs (Insulated Gate Bipolar Transistors) 374, 376, respectively. Free wheeling diodes (FwDis) 378, 380 are respectively connected in parallel with the IGBTs 374, 376. This provides circuit protection.

Figure 18A:
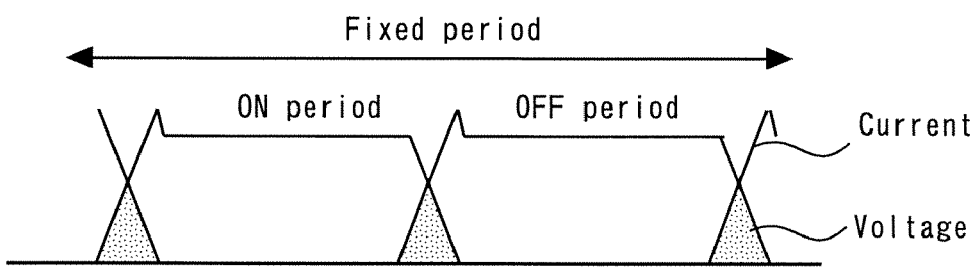
FIG. 18A shows a switching waveform of IGBT in accordance with the seventh embodiment.
Figure 18B:
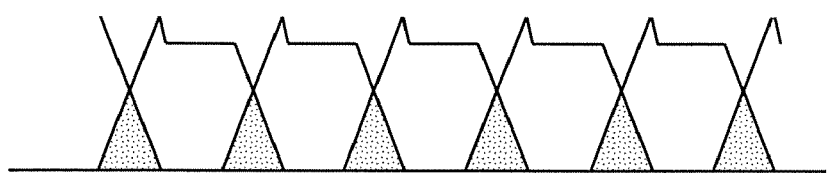
FIG. 18B shows a waveform that is obtained when switching is performed at shorter ON/OFF intervals than in FIG. 18A although the duty ratio is the same as in FIG. 18A.

In the aforementioned booster system, the raised voltage is determined by the ON-OFF time ratio (hereinafter referred to as the duty ratio) of IGBT 376. FIG. 18A shows a switching waveform of IGBT 376. FIG. 18B shows a waveform that is obtained when switching is performed at shorter ON/OFF intervals than in FIG. 18A although the duty ratio is the same as in FIG. 18A. The longer the period during which IGBT 376 is on, the higher the voltage that can be generated. IGBT-based switching differs from mechanical switching in that there arises a period during which the product of current I and voltage V is not zero (this period is hereinafter referred to as the cross period). The cross period is shaded in FIGS. 18A and 18B. It indicates a power loss. Therefore, if switching is performed as short intervals as indicated in FIG. 18B, the power loss may increase.

The sub-units according to the present embodiment simulate the amount of power loss of IGBT 376. If the result of simulation indicates that a predetermined amount of power loss will be exceeded, the switching intervals are increased while keeping the duty ratio. This makes it possible to reduce the power loss while raising the voltage as desired.

Figure 19:
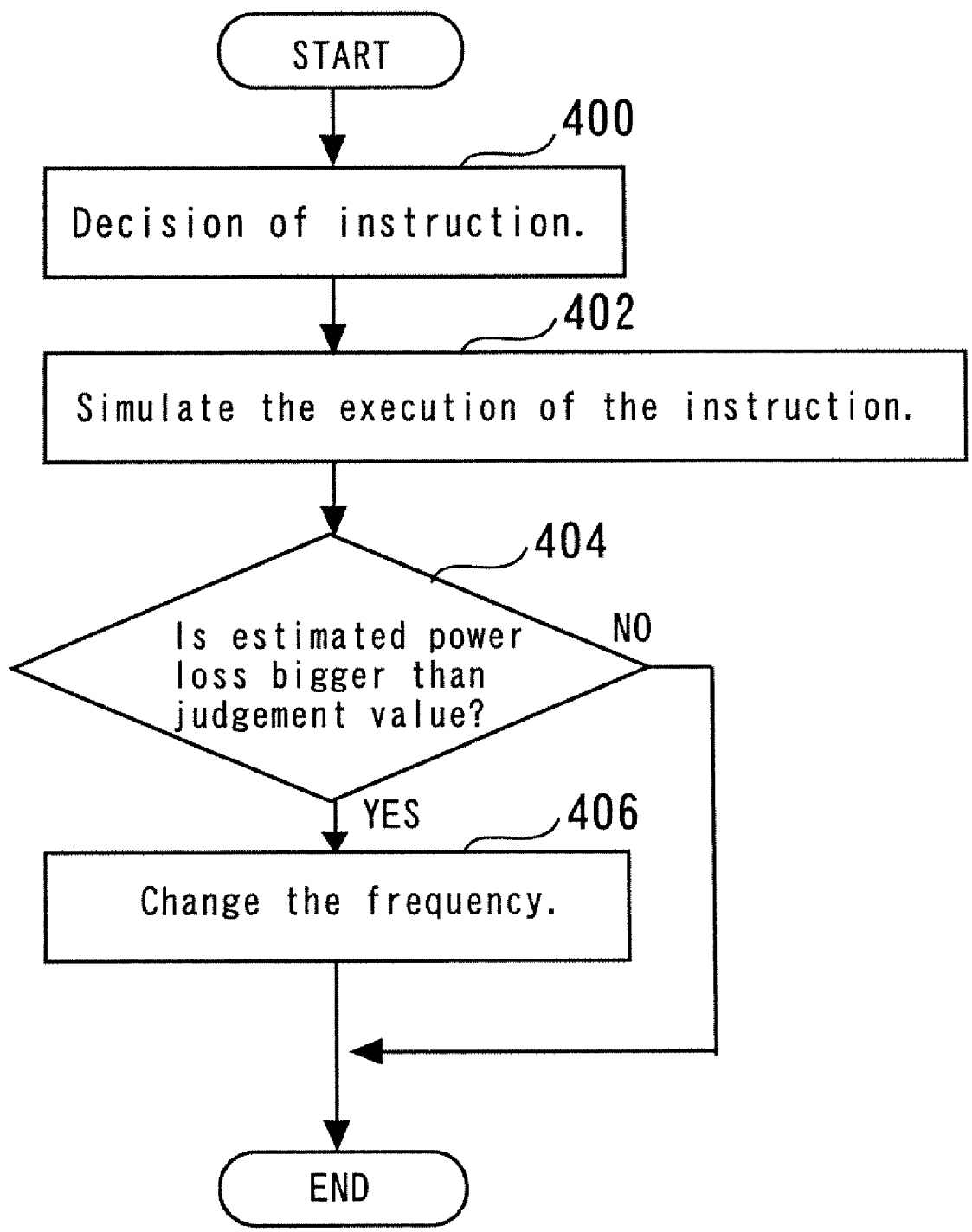
FIG. 19 is a flowchart illustrating a routine that sub-unit executes in accordance with the seventh embodiment.

FIG. 19 is a flowchart illustrating a routine that sub-unit 13 executes in accordance with the present embodiment. First of all, the instruction to be executed is determined (step 400). Next, the simulator included in sub-unit 13 simulates the execution of the instruction (step 402). This simulation is performed to estimate the power loss. The estimated power loss is then compared against a judgment value (step 404). The judgment value is a predetermined maximum value of power loss that can be tolerated by the system. If the comparison made in step 404 indicates that the judgment value will be exceeded by the power loss, the switching intervals are increased while keeping the duty ratio. In other words, the switching intervals are increased while keeping the duty ratio as indicated in FIG. 18A in a situation where switching is performed at short intervals as shown in FIG. 18B. Increasing the intervals in this manner reduces the power loss. If, on the other hand, the comparison made in step 404 indicates that the judgment value will not be exceeded by the power loss, the instruction determined in step 400 is retained. As described above, the present embodiment reduces the power loss of the booster system to avoid a problem that may be caused by a power loss.

Although the present embodiment uses the booster system, the present invention is not limited to the use of the booster system. Power loss reduction, which is an advantage provided by the present invention, can be achieved by exercising control to vary the pulse duty ratio.

Eighth Embodiment

An eighth embodiment of the present invention will now be described. The eighth embodiment relates to control sub-units that autonomously keep operating while the withstand voltage of an incorporated device is not exceeded.

The eighth embodiment has the same configuration as the seventh embodiment. The present embodiment is characterized by the booster system, as is the case with the seventh embodiment.

When a sub-unit having a semiconductor power device attempts to output a target torque, the voltage to be generated may exceed the withstand voltage.

The sub-units according to the present embodiment judge whether they can be damaged by a high voltage when the booster system raises the voltage. If it is anticipated that the sub-units will be damaged by a high voltage, the duty ratio is decreased. The duty ratio is the duty ratio of a drive signal for IGBT 376. When the duty ratio is decreased, the voltage generated by the booster system decreases. Consequently, the booster system can be protected.

Figure 20:
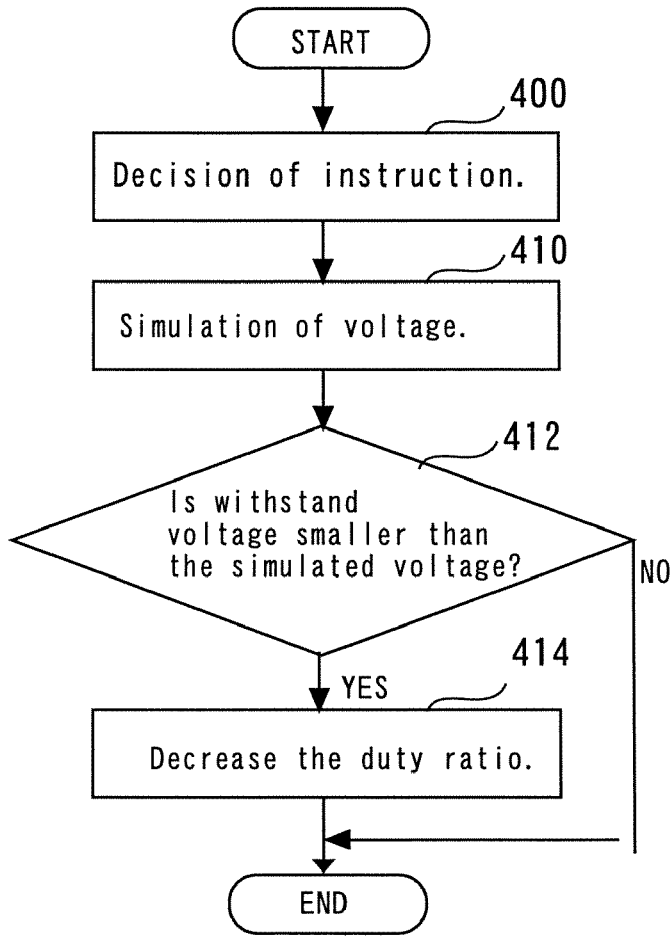
FIG. 20 is a flowchart illustrating a routine that sub-unit executes in accordance with the eighth embodiment.
Figure 21A:
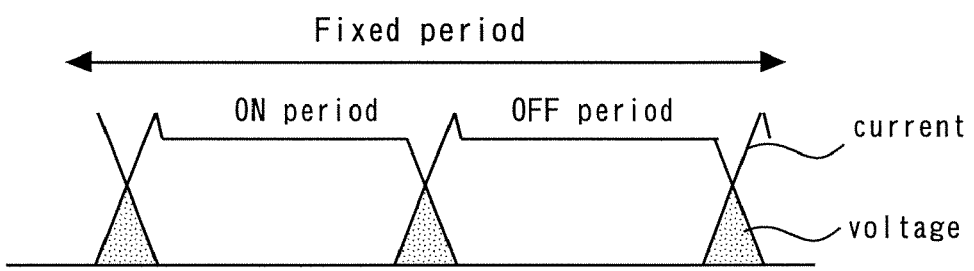
FIG. 21A illustrates increased duty ratio.
Figure 21B:
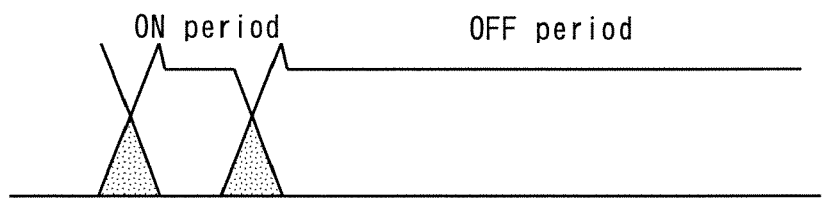
FIG. 21B illustrates decreased duty ratio.

FIG. 20 is a flowchart illustrating a routine that sub-unit 13 executes in accordance with the present embodiment. First of all, the instruction to be executed is determined (step 400). Next, the simulator included in sub-unit 13 simulates the execution of the instruction (step 410). This simulation is performed to calculate a voltage that will be reached when the instruction determined in step 400 is executed. The voltage that will be reached is a voltage that will be generated by the booster system. Next, the voltage that will be reached, which is calculated as described above, is compared against a withstand voltage (step 412). The withstand voltage is a predetermined maximum value of voltage that can be tolerated by the device. If the comparison made in step 412 indicates that the withstand voltage will be exceeded by the voltage that will be reached, step 414 is performed to decrease the duty ratio. When the duty ratio is decreased, the voltage stored in the reactor 36 shown in FIG. 17 decreases, thereby decreasing the generated voltage. The duty ratio is decreased by shortening the ON period as indicated in FIGS. 21A and 21B. When the duty ratio is decreased in the above manner, the voltage that will be reached decreases. If, on the other hand, the comparison made in step 412 indicates that the withstand voltage will not be exceeded by the voltage that will be reached, the instruction determined in step 400 is retained. As described above, the present embodiment decreases the duty ratio to ensure that the voltage reached by the booster system does not exceed the withstand voltage. This makes it possible to prevent sub-unit 13 from being damaged by a high voltage.

Although the present embodiment uses the booster system, the present invention is not limited to the use of the booster system. Conducting an operation at a voltage not higher than the withstand voltage of the power semiconductor, which is an advantage provided by the present invention, can be achieved by exercising control to vary the pulse duty ratio.

Ninth Embodiment

A ninth embodiment of the present invention will now be described. The ninth embodiment relates to control sub-units that operate without exceeding an allowable temperature limit by autonomously reducing the energization time.

The ninth embodiment has the same configuration as the first embodiment. Referring to FIG. 3, which shows the configuration of sub-unit 13, the three-phase AC inverter 32 raises the chip temperature when its energization time increases. From the viewpoint of safe sub-unit operations, it is necessary to prevent the chip temperature from exceeding an allowable temperature limit.

The sub-units according to the present embodiment judge whether the chip temperature will exceed the allowable temperature limit when the three-phase AC inverter 32 is energized for a predetermined period of time. If it is judged that the chip temperature will exceed the allowable temperature limit, the sub-units decrease the energization time as needed to ensure that the allowable temperature limit will not be exceeded. The allowable temperature limit is predetermined to ensure that the sub-units safely operate. The present embodiment can assure safe operations because it operates the sub-units continuously at a temperature below the allowable temperature limit.

Figure 22:
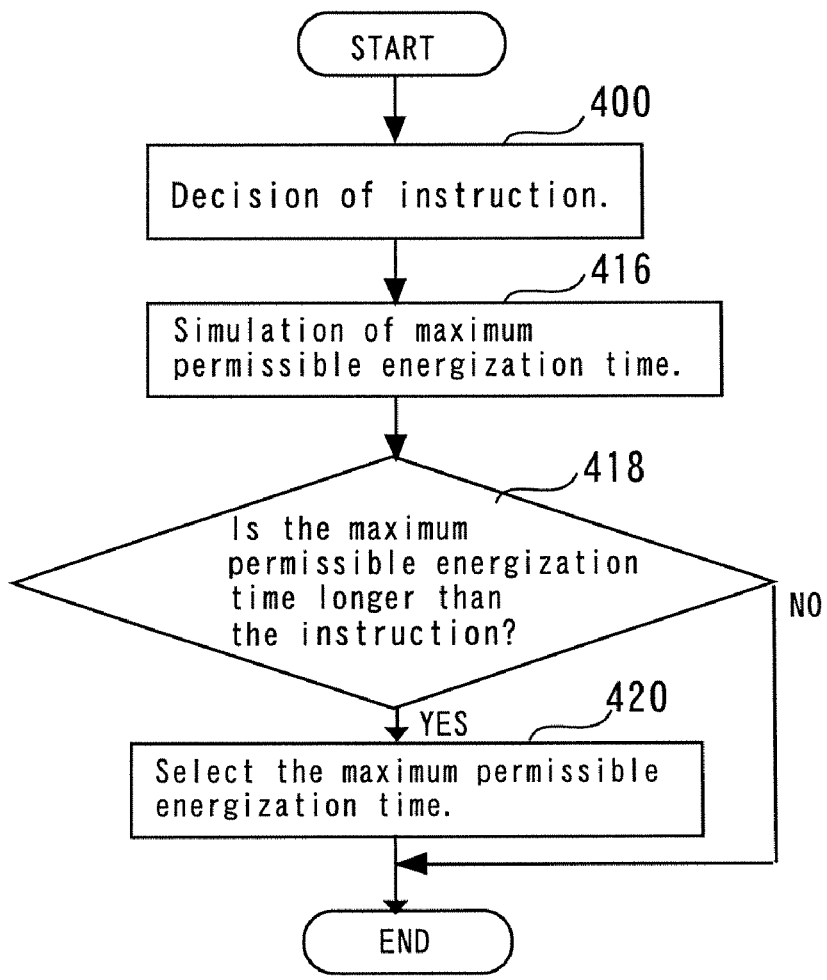
FIG. 22 is a flowchart illustrating a routine that sub-unit executes in accordance with the ninth embodiment.
Figure 23A:
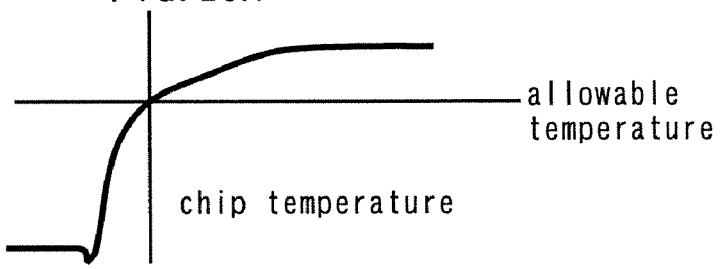
FIG. 23A illustrates the relation of chip temperature to energization time.
Figure 23B:
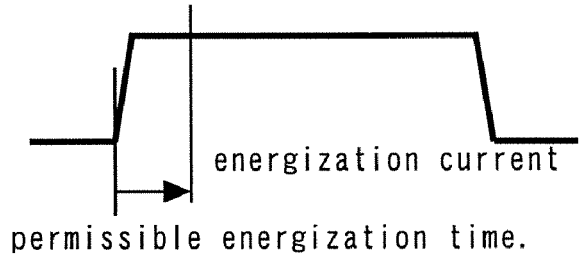
FIG. 23B illustrates the maximum permissible energization time.

FIG. 22 is a flowchart illustrating a routine that sub-unit 13 executes in accordance with the present embodiment. First of all, the instruction to be executed is determined (step 400). Next, the simulator included in sub-unit 13 performs a simulation (step 416). This simulation is performed to determine maximum permissible energization time. The maximum permissible energization time is the maximum period of time during which energization can be continued without raising the chip temperature above the allowable temperature limit. FIGS. 23A and 23B schematically illustrate a method of determining the maximum permissible energization time. The horizontal axes in FIGS. 23A and 23B represent time. FIGS. 23A and 23B indicate that the chip temperature rises when an energization current begins to flow and reaches the allowable temperature limit when a certain period of time elapses. As indicated in FIG. 23B, the maximum permissible energization time is the interval between the instant at which energization starts and the instant at which the chip temperature reaches the allowable temperature limit. In step 416, the simulation is conducted on the basis of the current chip temperature to determine the maximum permissible energization time.

Step 418 is performed to compare the maximum permissible energization time calculated in step 416 against the energization time contained in the instruction determined in step 400 (hereinafter referred to as the prescribed energization time). If the comparison indicates that the maximum permissible energization time is longer than the prescribed energization time, the prescribed energization time is retained. In this instance, the operation can be conducted at a temperature below the allowable temperature limit even when energization is performed for the prescribed energization time. If, on the other hand, the maximum permissible energization time is shorter than the prescribed energization time, the maximum permissible energization time is selected (step 420). This ensures that sub-unit operations are safe although the energization time is decreased.

The present embodiment uses the three-phase AC inverter. However, the present invention is not limited to the use of the three-phase AC inverter. The use of a device that exercises control in accordance with energization time provides the advantages of the present invention, which have been described above.

Tenth Embodiment

A tenth embodiment of the present invention will now be described. The tenth embodiment relates to control sub-units that assure safe operations of a power semiconductor by decreasing, for instance, the energization time for the power semiconductor or shutting off the power supply to the power semiconductor, and to a control main unit that is used with the control sub-units.

Figure 24:
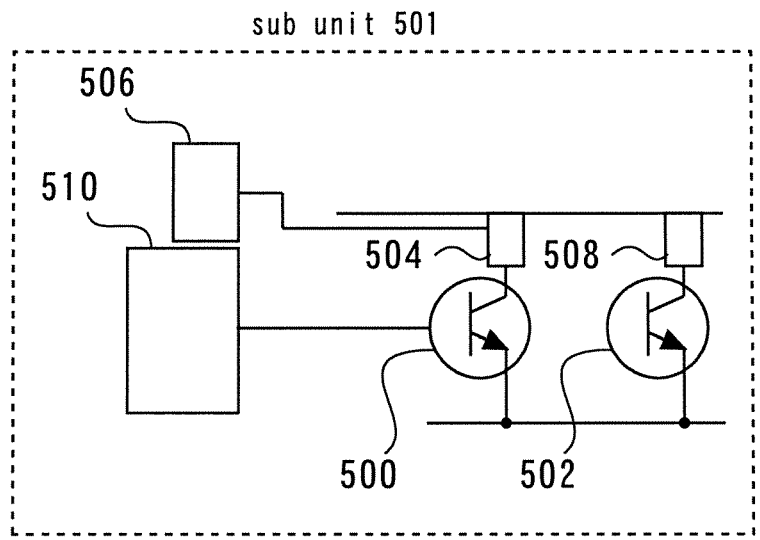
FIG. 24 illustrates a sub unit of tenth embodiment.

As shown in FIG. 1, the tenth embodiment includes a main unit and a plurality of sub-units. As one of the sub-units, the present embodiment includes sub-unit 501, which is shown in FIG. 24. Sub-unit 501 includes a plurality of series-connected power semiconductors and relays. More specifically, power semiconductor 500 is connected in series with relay 504, and power semiconductor 502 is connected in series with relay 508. Further, power semiconductor 500 and relay 504 are connected in parallel with power semiconductor 502 and relay 508. Since the power semiconductors are connected in parallel with each other, it is possible to judge whether the individual power semiconductors should be isolated, and isolate them as needed. This isolation is achieved by de-energizing the power semiconductors. Power semiconductors 500 and 502 are controlled by a semiconductor control device 510. Sub-unit 501 also includes a semiconductor diagnostic device 506. The semiconductor diagnostic device 506 runs a diagnostic check on power semiconductors 500 and 502 in accordance with the amount of an OFF-period leak current (hereinafter referred to as the leak amount).

The sub-units containing the power semiconductors may become short-circuited due to an increase in the leak amount of a power semiconductor. If a power semiconductor is short-circuited, energization control cannot be provided over the power semiconductor. To permit the system to achieve a target torque in a situation where energization control cannot be provided over a power semiconductor, it is necessary to have the main unit recognize that the power semiconductor is uncontrollable.

The sub-units according to the present embodiment can reduce the amount of power supply to a power semiconductor or shut off the power supply to it in accordance with the leak amount of the power semiconductor. The semiconductor diagnostic device included in each sub-unit determines the leak amount. This makes it possible to assure safe operations of the power semiconductor. Further, when the amount of power supply to a power semiconductor is reduced or the power supply is shut off as described above, the associated sub-unit according to the present embodiment notifies the main unit of such power supply amount reduction or power supply shutoff. This permits the main unit to formulate a proper control scheme for achieving the system's target torque.

Figure 25:
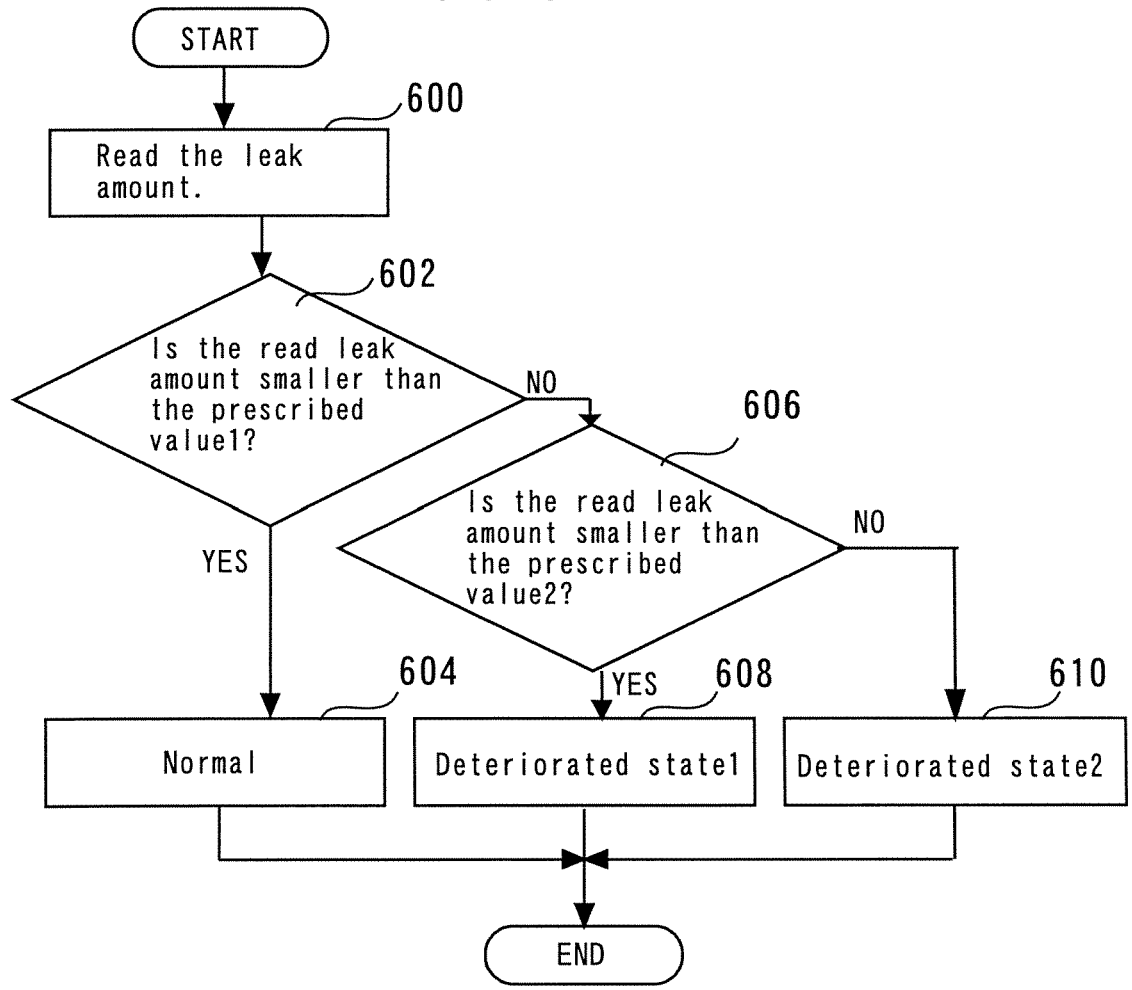
FIG. 25 is a flowchart illustrating a routine that the semiconductor diagnostic device included in sub-unit executes in accordance with the tenth embodiment.

FIG. 25 is a flowchart illustrating a routine that the semiconductor diagnostic device 506 included in sub-unit 501 executes in accordance with the present embodiment. First of all, the semiconductor diagnostic device 506 reads the leak amount of power semiconductor 500 (step 600). The read leak amount is then compared against prescribed value 1 (step 602). Prescribed value 1 is a predetermined leak amount value that is used to judge whether the leak amount is abnormal. If the leak amount is smaller than prescribed value 1, the routine terminates while regarding the leak amount of power semiconductor 500 as "normal" (step 604). If, on the other hand, the leak amount of power semiconductor 500 is greater than prescribed value 1, the leak amount is compared against prescribed value 2 (step 606). Prescribed value 2 is a predetermined leak amount value that is used to judge whether the power supply to the power semiconductor should be shut off. If the leak amount of power semiconductor 500 is smaller than prescribed value 2, it is judged that deteriorated state 1 prevails (step 608). If, on the other hand, the leak amount of power semiconductor 500 is greater than prescribed value 2, it is judged that deteriorated state 2 prevails (step 610). As described above, the semiconductor diagnostic device 506 classifies power semiconductor 500 as "normal," "deteriorated state 1," or "deteriorated state 2" depending on the leak amount of power semiconductor 500. In accordance with the classification, sub-unit 501 determines the action to be taken for the power semiconductor. The routine described above is also executed for power semiconductor 502.

Figure 26:
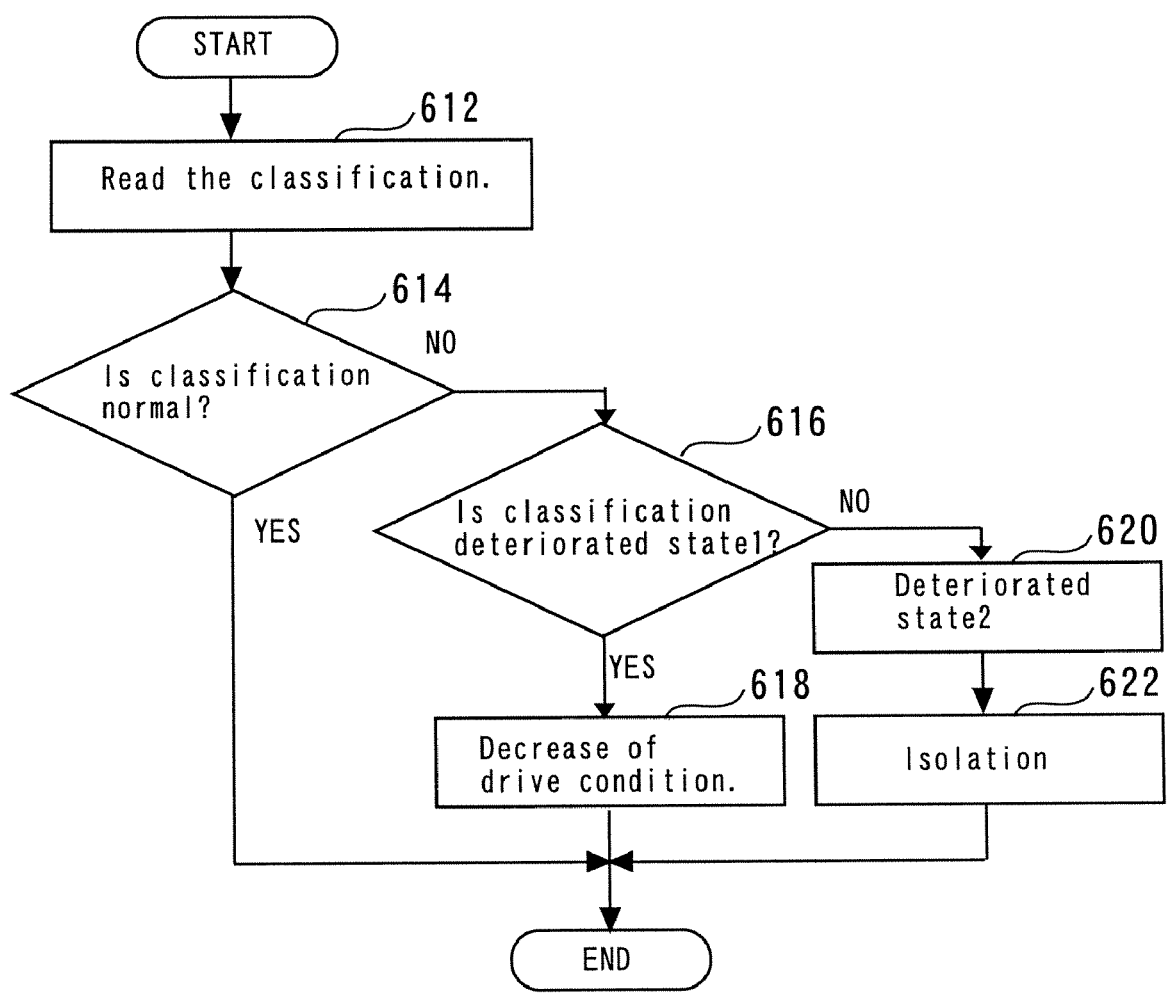
FIG. 26 is a flowchart illustrating a routine that sub-unit executes in accordance with the tenth embodiment.

FIG. 26 is a flowchart illustrating a routine that sub-unit 501 executes in accordance with the present embodiment. First of all, sub-unit 501 reads the classification about the leak amount of each power semiconductor from the semiconductor diagnostic device 506 (step 612). As described earlier, the classification contains information that indicates whether the leak amount of each of power semiconductors 500 and 502 is "normal," "deteriorated state 1," or "deteriorated state 2." Next, step 614 is performed to judge whether the classification read in step 612 is "normal." If it is judged that the classification is "normal," the routine terminates because there is no request for the main unit. However, if it is judged that the classification is not "normal," processing proceeds to step 616. Step 616 is performed to judge whether the classification is "deteriorated state 1." If it is judged that the classification is "deteriorated state 1," control is exercised, for instance, with the energization time decreased by the method described in conjunction with the seventh to ninth embodiments. This ensures that the sub-unit can continue with a safe operation. The main unit is notified of the aforementioned control that is exercised, for instance, with the energization time decreased (step 618). Upon receipt of the notification, the main unit reissues an instruction by the method described in conjunction with the first to sixth embodiments for the purpose of achieving the target torque. If, on the other hand, the judgment result obtained in step 616 does not indicate that the classification is "deteriorated state 1," processing proceeds to step 620. In this instance, the classification read in step 612 is "deteriorated state 2."

"Deteriorated state 2" indicates that the power supply should be shut off because the leak amount of a power semiconductor is greater than prescribed value 2. In this instance, sub-unit 501 isolates the power semiconductor in "deteriorated state 2" by giving a signal to the associated relay (step 620). Since the power semiconductors are connected in parallel with each other as described earlier, they can be isolated on an individual basis. In step 622, the main unit is notified that a power semiconductor is isolated to reduce the amount of power supply. Upon receipt of the notification, the main unit reissues an instruction by the method described in conjunction with the first to sixth embodiments for the purpose of achieving the target torque.

As described with reference to FIGS. 25 and 26, the present embodiment can reduce the amount of power supply to a power semiconductor or shut off the power supply to it in accordance with the leak amount of the power semiconductor. This makes it possible to generate the target torque to the utmost extent, protect the power semiconductors, and assure safe operations of the power semiconductors.

Although the present embodiment assumes that two power semiconductors are used, the present invention is not limited to the use of the two power semiconductors. As far as the power semiconductors are connected in parallel with each other, the advantages of the present invention can be provided without regard to the number of power semiconductors.

The present invention makes it possible to provide sub-unit protection and continuously operate the entire system.

Obviously many modifications and variations of the present invention are possible in the light of the above teachings. It is therefore to be understood that within the scope of the appended claims the invention may be practiced otherwise than as specifically described.

The entire disclosure of a Japanese Patent Application No. 2007-062226, filed on Mar. 12, 2007 including specification, claims, drawings and summary, on which the Convention priority of the present application is based, are incorporated herein by reference in its entirety.

What is claimed is:

1. A control sub-unit comprising:
instruction reception means for receiving an instruction from an external unit;
sensor means for sensing parameters related to an operation status of the control sub-unit;
simulation means for carrying out a simulation in accordance with the instruction received from the external unit to assure safe operation of the control sub-unit;
executability judgment means for judging whether the instruction received by the instruction reception means is executable by comparing the parameters sensed by the sensor means during the simulation with predetermined values of the parameters, which assure safe operation of the control sub-unit;
instruction execution means for executing an instruction that is judged by the executability judgment means to be executable; and
executable plan transmission means for transmitting an executable plan to the external unit instead of executing the instruction when the received instruction is judged by the executability judgment means to be unexecutable.

2. The control sub-unit according to claim 1, wherein the parameters include a temperature, current and voltage.

3. The control sub-unit according to claim 1, wherein the received instruction is judged by the executability judgment means to be unexecutable when one of the parameters exceeds a predetermined value based on the simulation.

4. The control sub-unit according to claim 1, wherein the instruction reception means receives from the external unit an additional instruction that is different from the instruction and is based on the executable plan.

5. A control sub-unit comprising:
multiple instruction reception means for receiving a plurality of instructions from an external unit;
multiple sensor means for sensing parameters related to an operation status of the control sub-unit;
multiple simulation means for carrying out simulations in accordance with the instructions received from the external unit to assure safe operation of the control sub-unit;
multiple instruction executability judgment means for judging whether each of the plurality of instructions received by the multiple instruction reception means is executable by comparing the parameters sensed by the multiple sensor means during the simulation with predetermined values of the parameters, which assure safe operation of the control sub-unit;
execution means for executing an instruction that is judged by the multiple instruction executability judgment means to be executable; and
executable plan transmission means for transmitting an executable plan to the external unit instead of executing the instruction when the received instructions are judged by the multiple instruction executability judgment means to be unexecutable.

6. The control sub-unit according to claim 5, further comprising:
notification means for notifying an external unit of the instruction that is judged by the multiple instruction executability judgment means to be executable;
selected instruction reception means for receiving a selection instruction that is selected by the external unit in accordance with a notification given by the notification means; and
selected instruction execution means for executing the selection instruction that is received by the selected instruction reception means.

7. A control sub-unit comprising:
instruction reception means for receiving an instruction from an external unit;
sensor means for sensing parameters related to an operation status of the control sub-unit;
simulation means for carrying out a simulation in accordance with the instruction received from the external unit to assure safe operation of the control sub-unit;
executability judgment means for judging whether an instruction received by the instruction reception means is executable by comparing the parameters sensed by the sensor means during the simulation with predetermined values of the parameters, which assure safe operation of the control sub-unit;
executable plan transmission means for transmitting an executable plan to the external unit instead of executing the instruction when the received instructions are judged by the multiple instruction executability judgment means to be unexecutable;
instruction change means, which, when the instruction received by the instruction reception means is judged by the executability judgment means to be unexecutable, switches from the instruction received by the instruction reception means to an executable instruction based on the executable plan transmitted to the external unit; and
means for executing the executable instruction or an instruction that is judged by the executability judgment means to be executable.

* * * * *